US010200937B2

(12) United States Patent
Chai et al.

(10) Patent No.: US 10,200,937 B2
(45) Date of Patent: Feb. 5, 2019

(54) MESSAGE BROADCAST METHOD, BASE STATION, AND USER EQUIPMENT

(71) Applicant: Huawei Technologies Co., Ltd., Shenzhen (CN)

(72) Inventors: Li Chai, Beijing (CN); Kunpeng Liu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/192,864

(22) Filed: Jun. 24, 2016

(65) Prior Publication Data

US 2016/0309396 A1 Oct. 20, 2016

Related U.S. Application Data

(63) Continuation of application No. PCT/CN2013/090428, filed on Dec. 25, 2013.

(51) Int. Cl.
*H04W 48/10* (2009.01)
*H04B 7/0452* (2017.01)
(Continued)

(52) U.S. Cl.
CPC .......... *H04W 48/10* (2013.01); *H04B 7/0452* (2013.01); *H04W 16/28* (2013.01); *H04L 5/0053* (2013.01)

(58) Field of Classification Search
CPC .... H04W 48/10; H04W 16/28; H04B 7/0452; H04L 5/0053
See application file for complete search history.

(56) References Cited

U.S. PATENT DOCUMENTS 6,804,521 B2 * 10/2004 Tong ................. H04W 16/28
370/322
2007/0223438 A1 9/2007 Bennett
(Continued)

FOREIGN PATENT DOCUMENTS

CN 1859637 A 11/2006
CN 101102524 A 1/2008
(Continued)

OTHER PUBLICATIONS

"General Considerations for D2D Discovery," 3GPP TSG-RAN1 Meeting #73, R1-132067, Agent Item 6.2.7.3, Alcatel-Lucent, Alcatel-Lucent Shanghai Bell, Discussion, pp. 104, Fukuoka, Japan, May 2013.

(Continued)

*Primary Examiner* — Ajay Cattungal
(74) *Attorney, Agent, or Firm* — Slater Matsil, LLP

(57) ABSTRACT

Embodiments of the present disclosure disclose a message broadcast method, a base station, and user equipment. The message broadcast method includes: determining, by a base station, a piece of system subgroup information of system information of a first cell, where each piece of system subgroup information includes system information content that is applied to a user equipment group that corresponds to the system subgroup information. The method also includes broadcasting, to the user equipment group, the system subgroup information that corresponds to the user equipment group. In such a manner, system information that is generated due to a requirement of a new technology can be effectively reduced, and user equipment can be prevented from receiving information unrelated to the user equipment and triggering unnecessary behavior.

20 Claims, 5 Drawing Sheets

(51) Int. Cl.
*H04W 16/28* (2009.01)
*H04L 5/00* (2006.01)

(56) References Cited

U.S. PATENT DOCUMENTS

| | | |
|---|---|---|
| 2007/0281724 A1 | 12/2007 | Isobe et al. |
| 2010/0195578 A1 | 8/2010 | Razdan et al. |
| 2011/0032839 A1* | 2/2011 | Chen ............... H04B 7/024 370/252 |
| 2012/0270535 A1* | 10/2012 | Chen ............... H04W 24/10 455/422.1 |
| 2012/0275409 A1* | 11/2012 | Han ................. H04L 1/0007 370/329 |
| 2012/0284413 A1 | 11/2012 | Miura |
| 2012/0322379 A1 | 12/2012 | Eun et al. |
| 2014/0153488 A1* | 6/2014 | Koivisto ............ H04B 1/10 370/328 |
| 2014/0185495 A1* | 7/2014 | Kuchibhotla ....... H04L 5/001 370/281 |
| 2014/0187283 A1* | 7/2014 | Nimbalker ........ H04W 72/048 455/550.1 |
| 2014/0242995 A1 | 8/2014 | Lee et al. |
| 2014/0314166 A1* | 10/2014 | Gomadam ......... H04B 7/0452 375/267 |
| 2015/0098440 A1* | 4/2015 | Yang ................ H04J 11/0056 370/330 |
| 2015/0163843 A1 | 6/2015 | Song et al. |
| 2016/0174278 A1 | 6/2016 | Chunyan et al. |
| 2016/0323026 A1* | 11/2016 | Zhu .................. H04L 5/14 |

FOREIGN PATENT DOCUMENTS

| | | |
|---|---|---|
| CN | 101180899 A | 5/2008 |
| CN | 101217784 A | 7/2008 |
| CN | 100461897 C | 2/2009 |
| CN | 101562863 A | 10/2009 |
| CN | 103188706 A | 7/2013 |
| CN | 103460780 A | 12/2013 |
| EP | 2922327 A1 | 9/2015 |
| WO | 2012109790 A1 | 8/2012 |
| WO | 2012118311 A2 | 9/2012 |
| WO | 2013055173 A2 | 4/2013 |
| WO | 2013166999 A1 | 11/2013 |
| WO | 2014026384 | 2/2014 |

OTHER PUBLICATIONS

"Future Smartphone Solution White Paper," Issue 2.0, Change History, Huawei Technologies, Smartphone Ecosystem R&D Support Team, Sep. 17, 2012, 32 pages.

Li, Yue et al., "System Design for Multiple Users Cooperative Communication in LTE," IEEE Vehicular Technology conference (VTC Fall), 2013 IEEE 78th, Sep. 2-5, 2013, 6 pages.

Mao, Yinian et al., "Security Issues in Cooperative Communications: Tracing Adversarial Relays," Department of ECE, University of Maryland, IEEE ICASSP 2006, 4 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.5.0, Sep. 2013, 347 pages.

"System Design Considerations for CoMP and eICIC," Agenda Item: 7.5.3, Source: Hitachi Ltd., Document for: Discussion and Decision, 3GPP TSG-RAN WG1 Meeting #66bis, R1-113065, Zhuhai, China, Oct. 10th-14th, 2011, 7 pages.

"Text Proposals for HetNet Mobility," Agenda Item: 102, Source: Huawei, HiSilicon, Document for: Discussion/Decision, 3GPP TSG-RAN WG2 Meeting #83, R2-132963, Barcelona, Spain, Aug. 19th-23rd, 2013, 8 pages.

* cited by examiner

MESSAGE BROADCAST METHOD, BASE STATION, AND USER EQUIPMENT

CROSS-REFERENCE TO RELATED APPLICATIONS

This application is a continuation of International Application No. PCT/CN2013/090428, filed on Dec. 25, 2013, which application is hereby incorporated herein by reference.

TECHNICAL FIELD

The present disclosure relates to a message broadcast method, a base station, and user equipment.

BACKGROUND

A mobile communications network generally uses a cellular system, that is, different base stations are set up in different places, where each base station forms a cell, and is responsible for communication of mobile users in the place. Some hotspot areas with a large communication traffic volume exist in a general mobile communications network. In order to provide a larger system capacity for the hotspot areas, micro cells are generally set up in the hotspot areas, and services are provided to mobile users in the hotspot areas by using the micro cells.

Therefore, a mobile communications network is generally a heterogeneous network (Het Net). First, a macro cell is established by using a macro base station to implement a large range of continuous network coverage, and then a micro cell is established in a hotspot area by using a micro base station to perform coverage overlapping, where the micro cell provides a larger system capacity.

System information broadcast is an important function in a communications system, and mainly provides main information of an access network system, so that user equipment (UE) establishes a wireless connection. System information in the system information broadcast is a link connecting UE and a network, and the UE and an evolved universal terrestrial radio access network implement various types of services and physical processes of wireless communication by means of the system information transmission.

In many technologies, message broadcast is strongly regional. For example, during discovery of a small cell, most of the time, system information is required for providing small cell information of a neighboring cell, such as a physical cell identifier, frequency information, or reference signaling information, and device-to-device (D2D) communication user equipment needs to determine whether there is an available resource in a surrounding area of the D2D communication user equipment.

In an existing message broadcast method, same system information is generally broadcast to all UEs in a cell to save a radio resource; therefore, system information that is generated due to a requirement of a new technology cannot be reduced. In addition, user equipment may therefore receive a message unrelated to the user equipment, and trigger unnecessary behavior.

SUMMARY

The present disclosure mainly resolves a technical problem of how to broadcast system subgroup information for a user equipment group according to a requirement of the user equipment group.

In view of this, the present disclosure sets forth a message broadcast method, a base station, and user equipment, which can effectively reduce system information that is generated due to a requirement of a new technology, and user equipment can be prevented from receiving a message unrelated to the user equipment and triggering unnecessary behavior.

According to a first aspect, the present disclosure provides a message broadcast method, where the method includes: determining, by a base station, at least one piece of system subgroup information of system information of a first cell, where each piece of system subgroup information includes system information content that is applied to a user equipment group that corresponds to the system subgroup information, where the first cell refers to a cell controlled by the base station, and the user equipment group is a group that includes at least one user equipment of the first cell; and broadcasting, to the user equipment group, the system subgroup information that corresponds to the user equipment group.

With reference to the first aspect, in an implementation of the first aspect: before the determining, by a base station, at least one piece of system subgroup information of a system information of a first cell, the method further includes: dividing user equipment in different areas in the first cell into different user equipment groups; or dividing user equipment of different types in the first cell into different user equipment groups; or dividing user equipment that run different types of services in the first cell into different user equipment groups.

In an implementation of the first aspect: the broadcasting, to the user equipment group, system subgroup information that corresponds to each user equipment group includes: broadcasting, to the user equipment group by using a beam that corresponds to an area in which each user equipment group is located, the system subgroup information that corresponds to each user equipment group; or broadcasting, to the user equipment group by using a system information radio network temporary identifier that corresponds to an area in which each user equipment group is located, the system subgroup information that corresponds to each user equipment group, where the system subgroup information that corresponds to each user equipment group corresponds to a different system information radio network temporary identifier.

In an implementation of the first aspect: the broadcasting, to the different user equipment groups by using a beam that corresponds to an area in which each user equipment group is located, the system subgroup information that corresponds to each user equipment group includes: performing multiple user-multiple input multiple output precoding on the system subgroup information that corresponds to each user equipment group; and broadcasting, to the user equipment group by using the beam that corresponds to the area in which each user equipment group is located, the system subgroup information on which the multiple input multiple output precoding has been performed and that corresponds to each user equipment group.

In an implementation of the first aspect: before the broadcasting, to the user equipment group, system subgroup information that corresponds to each user equipment group, the method further includes: dividing, by the base station, user equipment groups into different areas according to a clustering status of a neighboring cell relationship; or dividing user equipment groups into different areas according to a quantity of user equipment.

In an implementation of the first aspect: the division is static or semi-static.

In an implementation of the first aspect: before the broadcasting, to the different user equipment groups by using a beam that corresponds to an area in which each user equipment group is located, the system subgroup information that corresponds to each user equipment group, the method further includes: setting, by the base station, a beam width and a beam direction of a highly directional antenna according to location information of each area, so that a beam formed by the highly directional antenna can cover an area that corresponds to the beam.

In an implementation of the first aspect: the highly directional antenna is any one of: an array antenna, a parabolic antenna, a circular array antenna, and a three-dimensional grid array antenna.

In an implementation of the first aspect: the system subgroup information includes an identifier or a number or a subgroup indication that indicates a system subgroup.

In an implementation of the first aspect: the system subgroup information that corresponds to each user equipment group is distinguished by using an enhanced downlink physical control channel, or an enhanced downlink physical control channel and an enhanced downlink control channel.

In an implementation of the first aspect: the determining, by a base station, at least one piece of system subgroup information of system information of a first cell includes: determining at least one piece of system subgroup information of the system information of the first cell by configuring at least one parameter of a demodulation reference signal, a scrambling code sequence index, an antenna port, and precoding.

In an implementation of the first aspect: configuration of the parameter is static or semi-static.

In an implementation of the first aspect: the system subgroup information that corresponds to each user equipment group includes at least one of: information about a small cell adjacent to an area in which the user equipment group is located, and radio resource information used for device-to-device communication connection.

In an implementation of the first aspect: the information about a small cell includes at least one of: a physical cell identifier, frequency information, dedicated reference signal information, channel state information reference signal information, a common physical configuration, and information about a system information block; and the radio resource information used for device-to-device connection includes at least one of: an allocated resource, location information, and an interference level.

In an implementation of the first aspect: before the broadcasting, to the different user equipment groups, the system subgroup information that corresponds to each user equipment group, the method further includes: broadcasting, by the base station, public system information, where the public system information includes configuration information that corresponds to the system subgroup information and assistant identified fingerprint information.

In an implementation of the first aspect: the assistant identified fingerprint information includes positioning information or information about at least one cell of neighboring and co-coverage cells.

According to a second aspect, the present disclosure provides a message broadcast method, where the method includes: acquiring, by user equipment, configuration information related to system subgroup information that corresponds to a user equipment group that includes the user equipment, where each piece of system subgroup information includes system information content that is applied to a user equipment group that corresponds to the system subgroup information; and receiving, according to the configuration information, the system subgroup information that corresponds to the user equipment group that includes the user equipment.

In an implementation of the second aspect: the acquiring, by user equipment, configuration information related to system subgroup information that corresponds to a user equipment group that includes the user equipment includes: acquiring, by the user equipment in connected mode by using dedicated information, the configuration information related to the system subgroup information that corresponds to the user equipment group that includes the user equipment; or acquiring, by the user equipment in idle mode by using a radio resource control release message of an attach procedure, the configuration information related to the system subgroup information that corresponds to the user equipment group that includes the user equipment.

In an implementation of the second aspect: the configuration information related to the system subgroup information includes a quantity of antenna ports or precoding information.

In an implementation of the second aspect: before the acquiring, by user equipment, configuration information related to system subgroup information that corresponds to a user equipment group that includes the user equipment, the method further includes: receiving, by the user equipment, public system information, where the public system information includes configuration information that corresponds to the system subgroup information and assistant identified fingerprint information.

In an implementation of the second aspect: the assistant identified fingerprint information includes positioning information or information about at least one cell of neighboring and co-coverage cells.

In an implementation of the second aspect: the public system information further includes an identifier or a number of the system subgroup information.

In an implementation of the second aspect: the method further includes: re-acquiring, by the user equipment, public system information when the user equipment receives information indicating that system information changes or when system information remains unchanged for a predetermined time.

In an implementation of the second aspect: after the re-acquiring, by the user equipment, public system information, the method further includes: determining whether there is information indicating that the system subgroup information that corresponds to the user equipment group that includes the user equipment changes; and when there is information indicating that the system subgroup information that corresponds to the user equipment group that includes the user equipment changes, re-acquiring system subgroup information that corresponds to the user equipment group that includes the user equipment.

In an implementation of the second aspect: the determining whether there is information indicating that the system subgroup information that corresponds to the user equipment group that includes the user equipment changes includes: determining, from the information indicating that system information changes or the re-acquired public system information, whether there is information indicating that the system subgroup information that corresponds to the user equipment group that includes the user equipment changes.

In an implementation of the second aspect: the information indicating that system information changes is a paging message.

In an implementation of the second aspect: the user equipment is user equipment of a first cell, and the first cell is a cell controlled by a base station; and after the receiving, according to the configuration information, the corresponding system subgroup information, the method further includes: determining, by the user equipment further according to the system subgroup information that corresponds to the user equipment group that includes the user equipment, whether to trigger inter-frequency cell discovery and measurement.

In an implementation of the second aspect: the user equipment is user equipment for device-to-device communication; and after the receiving, according to the configuration information, the corresponding system subgroup information, the method further includes: determining, by the user equipment further according to the system subgroup information that corresponds to the user equipment group that includes the user equipment, whether there is an available device-to-device communication resource.

In an implementation of the second aspect: the user equipment is user equipment supporting a new carrier type; and after the receiving, according to the configuration information, the corresponding system subgroup information, the method further includes: obtaining, by the user equipment further according to the system subgroup information that corresponds to the user equipment group that includes the user equipment, co-coverage new-carrier-type system information.

According to a third aspect, the present disclosure provides a base station, where the base station includes a determining module and a broadcasting module. The determining module is configured to determine at least one piece of system subgroup information of system information of a first cell, where each piece of system subgroup information includes system information content that is applied to a user equipment group that corresponds to the system subgroup information, where the first cell refers to a cell controlled by the base station, and the user equipment group is a group that includes at least one user equipment of the first cell; and the broadcasting module is configured to broadcast, to the user equipment group according to the at least one piece of system subgroup information of the system information of the first cell that is determined by the determining module, the system subgroup information that corresponds to the user equipment group.

In an implementation of the third aspect: the base station further includes a division module, where: the division module is configured to divide user equipment in different areas in the first cell into different user equipment groups; or the division module is configured to divide user equipment of different types in the first cell into different user equipment groups; or the division module is configured to divide user equipment that run different types of services in the first cell into different user equipment groups.

In an implementation of the third aspect: the broadcasting module broadcasts, to the different user equipment groups by using a beam that corresponds to an area in which each user equipment group is located, system subgroup information that corresponds to each user equipment group; or the broadcasting module broadcasts, to the user equipment group by using a system information radio network temporary identifier that corresponds to an area in which each user equipment group is located, system subgroup information that corresponds to each user equipment group, where the system subgroup information that corresponds to each user equipment group corresponds to a different system information radio network temporary identifier.

In an implementation of the third aspect: the broadcasting module performs multiple user-multiple input multiple output precoding on the system subgroup information that corresponds to each user equipment group, and broadcasts, to the different user equipment groups by using the beam that corresponds to the area in which each user equipment group is located, the system subgroup information on which the multiple input multiple output precoding has been performed and that corresponds to each user equipment group.

In an implementation of the third aspect: the division module is further configured to divide user equipment groups into different areas according to a clustering status of a neighboring cell relationship; or divide user equipment groups into different areas according to a quantity of user equipment.

In an implementation of the third aspect: the division is static or semi-static.

In an implementation of the third aspect: the base station further includes a setting module, where the setting module is configured to set a beam width and a beam direction of a highly directional antenna according to location information of each area, so that a beam formed by the highly directional antenna can cover an area that corresponds to the beam.

In an implementation of the third aspect: the highly directional antenna is any one of: an array antenna, a parabolic antenna, a circular array antenna, and a three-dimensional grid array antenna.

In an implementation of the third aspect: the system subgroup information includes an identifier or a number or a subgroup indication that indicates a system subgroup.

In an implementation of the third aspect: the system subgroup information that corresponds to each user equipment group is distinguished by using an enhanced downlink physical control channel, or an enhanced downlink physical control channel and an enhanced downlink control channel.

In an implementation of the third aspect: the determining module determines at least one piece of system subgroup information of the system information of the first cell by configuring at least one parameter of a demodulation reference signal, a scrambling code sequence index, an antenna port, and precoding.

In an implementation of the third aspect: configuration of the parameter is static or semi-static.

In an implementation of the third aspect: the system subgroup information that corresponds to each user equipment group includes at least one of: information about a small cell adjacent to an area in which the user equipment group is located, and radio resource information used for device-to-device communication connection.

In an implementation of the third aspect: the information about a small cell includes at least one of: a physical cell identifier, frequency information, dedicated reference signal information, channel state information reference signal information, a common physical configuration, and information about a system information block; and the radio resource information used for device-to-device connection includes at least one of: an allocated resource, location information, and an interference level.

In an implementation of the third aspect: the broadcasting module is further configured to broadcast public system information, where the public system information includes configuration information that corresponds to the system subgroup information and assistant identified fingerprint information.

In an implementation of the third aspect: the assistant identified fingerprint information includes positioning information or information about at least one cell of neighboring and co-coverage cells.

According to a fourth aspect, the present disclosure provides user equipment, where the user equipment includes an acquiring module and a receiving module. The acquiring module is configured to acquire configuration information related to system subgroup information that corresponds to a user equipment group that includes the user equipment, where each piece of system subgroup information includes system information content that is applied to a user equipment group that corresponds to the system subgroup information; and the receiving module is configured to receive, according to the configuration information acquired by the acquiring module, the system subgroup information that corresponds to the user equipment group that includes the user equipment.

In an implementation of the fourth aspect: the acquiring module acquires, by using dedicated information, the configuration information related to the system subgroup information that corresponds to the user equipment group that includes the user equipment in connected mode; or the acquiring module acquires, by using a radio resource control release message of an attach procedure, the configuration information related to the system subgroup information that corresponds to the user equipment group that includes the user equipment in idle mode.

In an implementation of the fourth aspect: the configuration information related to the system subgroup information includes a quantity of antenna ports or precoding information.

In an implementation of the fourth aspect: the receiving module is further configured to receive public system information, where the public system information includes configuration information that corresponds to the system subgroup information and assistant identified fingerprint information.

In an implementation of the fourth aspect: the assistant identified fingerprint information includes positioning information or information about at least one cell of neighboring and co-coverage cells.

In an implementation of the fourth aspect: the public system information further includes an identifier or a number of the system subgroup information.

In an implementation of the fourth aspect: the receiving module is further configured to receive information indicating that system information changes; and the acquiring module is further configured to re-acquire public system information when the receiving module receives the information indicating that system information changes or when the system information remains unchanged for a predetermined time.

In an implementation of the fourth aspect: the user equipment further includes a judging module, where the judging module is configured to determine whether there is information indicating that the system subgroup information that corresponds to the user equipment group that includes the user equipment changes; and when there is information indicating that the system subgroup information that corresponds to the user equipment group that includes the user equipment changes, the acquiring module re-acquires system subgroup information that corresponds to the user equipment group that includes the user equipment.

In an implementation of the fourth aspect: the judging module is configured to determine, from the information indicating that system information changes or the re-acquired public system information, whether there is information indicating that the system subgroup information that corresponds to the user equipment group that includes the user equipment changes.

In an implementation of the fourth aspect: the information indicating that system information changes is a paging message.

In an implementation of the fourth aspect: the user equipment is user equipment of a first cell, and the first cell is a cell controlled by a base station; and the user equipment further includes a triggering module, where the triggering module is configured to determine, according to the system subgroup information that corresponds to the user equipment group that includes the user equipment, whether to trigger inter-frequency cell discovery and measurement.

In an implementation of the fourth aspect: the user equipment is user equipment for device-to-device communication; and the user equipment further includes a determining module, where the determining module is configured to determine, according to the system subgroup information that corresponds to the user equipment group that includes the user equipment, whether there is an available device-to-device communication resource.

In an implementation of the fourth aspect: the user equipment is user equipment supporting a new carrier type; and the user equipment further includes an obtaining module, where the obtaining module is configured to obtain co-coverage new-carrier-type system information according to the system subgroup information that corresponds to the user equipment group that includes the user equipment.

According to a fifth aspect, the present disclosure provides a base station, where the base station includes a processor, a memory, a transmitter, and a receiver. The processor is separately coupled to the memory, the transmitter, and the receiver. The processor is configured to determine at least one piece of system subgroup information of system information of a first cell, where each piece of system subgroup information includes system information content that is applied to a user equipment group that corresponds to the system subgroup information; and control the transmitter to broadcast, to the user equipment group, the system subgroup information that corresponds to the user equipment group, where the first cell refers to a cell controlled by the base station, and the user equipment group is a group that includes at least one user equipment of the first cell; the processor is further configured to control the receiver to receive communication data from a network; and the memory is configured to store the at least one piece of system subgroup information of the system information of the first cell.

In an implementation of the fifth aspect: the processor is further configured to divide user equipment in different areas in the first cell into different user equipment groups; or is configured to divide user equipment of different types in the first cell into different user equipment groups; or is configured to divide user equipment that run different types of services in the first cell into different user equipment groups.

In an implementation of the fifth aspect: the processor controls the transmitter to broadcast, to the different user equipment groups by using a beam that corresponds to an area in which each user equipment group is located, the system subgroup information that corresponds to each user equipment group; or the processor controls the transmitter to broadcast, to the user equipment group by using a system information radio network temporary identifier that corresponds to an area in which each user equipment group is located, the system subgroup information that corresponds to each user equipment group, where the system subgroup information that corresponds to each user equipment group corresponds to a different system information radio network temporary identifier.

In an implementation of the fifth aspect: the processor is configured to perform multiple user-multiple input multiple output precoding on the system subgroup information that corresponds to each user equipment group, and controls the transmitter to broadcast, to the different user equipment groups by using the beam that corresponds to the area in which each user equipment group is located, the system subgroup information on which the multiple input multiple output precoding has been performed and that corresponds to each user equipment group.

In an implementation of the fifth aspect: the processor is further configured to divide user equipment groups into different areas according to a clustering status of a neighboring cell relationship; or divide user equipment groups into different areas according to a quantity of user equipment.

In an implementation of the fifth aspect: the division is static or semi-static.

In an implementation of the fifth aspect: the processor is further configured to set a beam width and a beam direction of a highly directional antenna according to location information of each area, so that a beam formed by the highly directional antenna can cover an area that corresponds to the beam.

In an implementation of the fifth aspect: the highly directional antenna is any one of: an array antenna, a parabolic antenna, a circular array antenna, and a three-dimensional grid array antenna.

In an implementation of the fifth aspect: the system subgroup information includes an identifier or a number or a subgroup indication that indicates a system subgroup.

In an implementation of the fifth aspect: the system subgroup information that corresponds to each user equipment group is distinguished by using an enhanced downlink physical control channel, or an enhanced downlink physical control channel and an enhanced downlink control channel.

In an implementation of the fifth aspect: the processor determines at least one piece of system subgroup information of the system information of the first cell by configuring at least one parameter of a demodulation reference signal, a scrambling code sequence index, an antenna port, and precoding.

In an implementation of the fifth aspect: configuration of the parameter is static or semi-static.

In an implementation of the fifth aspect: the system subgroup information that corresponds to each user equipment group includes at least one of: information about a small cell adjacent to an area in which the user equipment group is located, and radio resource information used for device-to-device communication connection.

In an implementation of the fifth aspect: the information about a small cell includes at least one of: a physical cell identifier, frequency information, dedicated reference signal information, channel state information reference signal information, a common physical configuration, and information about a system information block; and the radio resource information used for device-to-device connection includes at least one of: an allocated resource, location information, and an interference level.

In an implementation of the fifth aspect: the processor is further configured to control the transmitter to broadcast public system information, where the public system information includes configuration information that corresponds to the system subgroup information and assistant identified fingerprint information.

In an implementation of the fifth aspect: the assistant identified fingerprint information includes positioning information or information about at least one cell of neighboring and co-coverage cells.

According to a sixth aspect, the present disclosure provides user equipment, where the user equipment includes a processor, a memory, a transmitter, and a receiver. The processor is separately coupled to the memory, the transmitter, and the receiver. The processor is configured to acquire configuration information related to system subgroup information that corresponds to a user equipment group that includes the user equipment, where each piece of system subgroup information includes system information content that is applied to a user equipment group that corresponds to the system subgroup information; and control the receiver to receive, according to the configuration information, the system subgroup information that corresponds to the user equipment group that includes the user equipment; the processor is further configured to control the transmitter to send out network data; and the memory is configured to store the configuration information and the system subgroup information.

In an implementation of the sixth aspect: the processor acquires, by using dedicated information, the configuration information related to the system subgroup information that corresponds to the user equipment group that includes the user equipment in connected mode; or acquires, by using a radio resource control release message of an attach procedure, the configuration information related to the system subgroup information that corresponds to the user equipment group that includes the user equipment in idle mode.

In an implementation of the sixth aspect: the configuration information related to the system subgroup information includes a quantity of antenna ports or precoding information.

In an implementation of the sixth aspect: the processor is further configured to control the receiver to receive public system information, where the public system information includes configuration information that corresponds to the system subgroup information and assistant identified fingerprint information.

In an implementation of the sixth aspect: the assistant identified fingerprint information includes positioning information or information about at least one cell of neighboring and co-coverage cells.

In an implementation of the sixth aspect: the public system information further includes an identifier or a number of the system subgroup information.

In an implementation of the sixth aspect, in a sixth possible implementation manner of the sixth aspect: the processor is further configured to control the receiver to receive information indicating that system information changes; and the processor re-acquires public system information when the receiver receives the information indicating that system information changes or when the system information remains unchanged for a predetermined time.

In an implementation of the sixth aspect: the processor is further configured to determine whether there is information indicating that the system subgroup information that corresponds to the user equipment group that includes the user equipment changes; and when there is information indicating that the system subgroup information that corresponds to the user equipment group that includes the user equipment changes, re-acquire system subgroup information that corresponds to the user equipment group that includes the user equipment.

In an implementation of the sixth aspect: the processor is configured to determine, from the information indicating that system information changes or the re-acquired public system information, whether there is information indicating that the system subgroup information that corresponds to the user equipment group that includes the user equipment changes.

In an implementation of the sixth aspect: the information indicating that system information changes is a paging message.

In an implementation of the sixth aspect: the user equipment is user equipment of a first cell, and the first cell is a cell controlled by a base station; and the processor is configured to determine, according to the system subgroup information that corresponds to the user equipment group that includes the user equipment, whether to trigger inter-frequency cell discovery and measurement.

In an implementation of the sixth aspect: the user equipment is user equipment for device-to-device communication; and the processor is configured to determine, according to the system subgroup information that corresponds to the user equipment group that includes the user equipment, whether there is an available device-to-device communication resource.

In an implementation of the sixth aspect: the user equipment is user equipment supporting a new carrier type; and the processor is configured to obtain co-coverage new-carrier-type system information according to the system subgroup information that corresponds to the user equipment group that includes the user equipment.

Compared with the prior art, the present disclosure has the following beneficial effects. In the foregoing technical solutions, a base station determines at least one piece of system subgroup information of system information of a first cell, where each piece of system subgroup information includes system information content that is applied to a user equipment group that corresponds to the system subgroup information, where the first cell refers to a cell controlled by the base station, and the user equipment group is a group that includes at least one user equipment of the first cell; and broadcasts, to the user equipment group, the system subgroup information that corresponds to the user equipment group. In such a manner, system information broadcast is more targeted, and user equipment receives only system subgroup information related to the user equipment; therefore, unnecessary behavior is not triggered.

DETAILED DESCRIPTION OF ILLUSTRATIVE EMBODIMENTS

Based on disadvantages in the prior art, embodiments of the present disclosure provide a message broadcast method, a base station, and user equipment, so as to resolve a technical problem of how to broadcast system information for a user equipment group according to a requirement of the user equipment group, thereby effectively reducing system information that is generated due to a requirement of a new technology, and user equipment can be prevented from receiving a message unrelated to the user equipment and triggering unnecessary behavior.

The following describes the technical solutions of the present disclosure in detail with reference to the accompanying drawings and specific embodiments.

Figure 1:
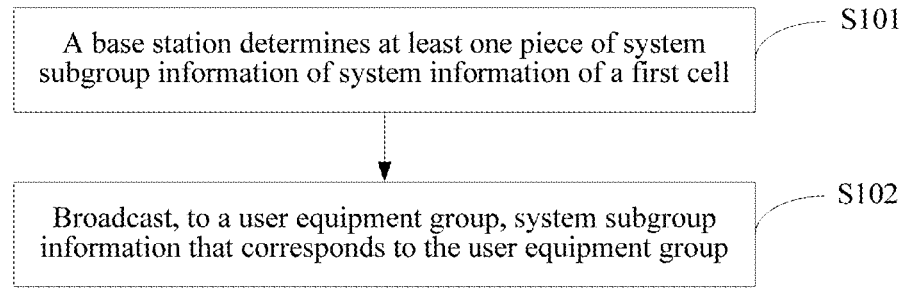
FIG. 1 is a flowchart of a first message broadcast method according to an embodiment of the present disclosure.

FIG. 1 is a flowchart of a first message broadcast method according to an embodiment of the present disclosure. The message broadcast method of this embodiment is described from the perspective of a base station. The message broadcast method of this embodiment includes the following.

The method shown in FIG. 1 includes S101: A base station determines at least one piece of system subgroup information of system information of a first cell.

Each piece of system subgroup information includes system information content that is applied to a user equipment group that corresponds to the system subgroup information. Specifically, system subgroup information that corresponds to each user equipment group includes at least one of: information about a small cell adjacent to an area in which the user equipment group is located, and radio resource information used for device-to-device communication connection. The first cell refers to a cell controlled by the base station, and the user equipment group is a group that includes at least one user equipment of the first cell.

For example, system subgroup information of a user equipment group 1 may include information about a small cell adjacent to an area in which the user equipment group 1 is located, and the information about a small cell may include at least one of: a physical cell identifier (PCI), frequency information, dedicated reference signal information, channel state information reference signal information, a common physical configuration, and information about a system information block (SIB). The system subgroup information of the user equipment group 1 may further include available radio resource information used for device-to-device (D2D) communication connection, and the radio resource information may include at least one of: an allocated resource, location information, and an interference level.

The system subgroup information that corresponds to each user equipment group is distinguished by using an physical downlink shared channel (PDSCH), or an enhanced physical downlink control channel (EPDCCH). For example, system subgroup information that corresponds to different user equipment groups uses different PDSCH resources, and different system subgroup information uses a same physical downlink control channel (PDCCH) resource; or different system subgroup information uses different EPDCCH resources; or different system subgroup information uses different PDSCH resources, and the different system subgroup information uses different code resources to scramble a PDCCH.

Further, the system subgroup information may further include an identifier or a number or a subgroup indication that indicates a system subgroup. The identifier or the number in the system subgroup information is used to identify different system subgroup information, and the subgroup indication is used to indicate a correspondence among the system subgroup information, a user equipment group, and an area in which the user equipment group is located.

The step of determining, by a base station, at least one piece of system subgroup information of system information of a first cell may be implemented by configuring at least one parameter of a demodulation reference signal, a scrambling code sequence index, an antenna port, and precoding. The precoding may be precoding predefined by using a cell-specific reference signal (CRS). For example, system subgroup information 1 is broadcast by using a beam 1 for which precoding is performed by means of precoding 1 (P1), and system subgroup information 2 and system subgroup information 3 are respectively broadcast by using a beam 2 and a beam 3 for which precoding is performed respectively by means of precoding 2 and precoding 3 (P2 and P3). A beam width and a beam direction of the beam 1 may cover the area in which the user equipment group 1 is located, and a beam width and a beam direction of the beam 2 and those of the beam 3 may respectively cover areas in which user equipment groups 2 and 3 are located.

Configuration of these parameters may be static or may be semi-static. For example, a smoothed value of a long period, for example, an average value or a weighted average value, may be obtained according to reference signal received power/reference signal received quality that is reported by UE in connected mode in the area in which the user equipment group is located, or may be set for reporting of channel state information (CSI).

The method shown in FIG. 1 includes S102: Broadcast, to a user equipment group, system subgroup information that corresponds to the user equipment group.

The base station broadcasts, to the user equipment group, the system subgroup information that corresponds to the user equipment group. For example, the base station broadcasts system subgroup information 1 to user equipment of the user equipment group 1, and respectively broadcasts system subgroup information 2 and system subgroup information 3 to the user equipment groups 2 and 3, where the system subgroup information 1 includes system information content that is applied to the user equipment group 1, the system subgroup information 2 includes system information content that is applied to the user equipment group 2, and the system subgroup information 3 includes system information content that is applied to the user equipment group 3.

In this embodiment, a specific implementation manner of broadcasting, by the base station, to a user equipment group, system subgroup information that corresponds to the user equipment group may include the following.

First, broadcast, to user equipment of each user equipment group by using a beam that corresponds to an area in which the user equipment group is located, the system subgroup information that corresponds to the user equipment group.

For example, system subgroup information 1 is broadcast by using a beam 1, and system subgroup information 2 and system subgroup information 3 are respectively broadcast by using beams 2 and 3. A beam width and a beam direction of the beam 1 may cover an area in which the user equipment group 1 is located, and a beam width and a beam direction of the beam 2 and those of the beam 3 may respectively cover areas in which user equipment groups 2 and 3 are located.

Second, broadcast, to user equipment of each user equipment group by using a system information radio network temporary identifier (SI-RNTI) that corresponds to an area in which each user equipment group is located, system subgroup information that corresponds to each user equipment group, where the system subgroup information that corresponds to each user equipment group corresponds to a different system information radio network temporary identifier.

For example, information about the broadcast system subgroup information 1 is scrambled by using an SI-RNTI-1, and information about the broadcast system subgroup information 2 is scrambled by using an SI-RNTI-2. UE in the user equipment group that corresponds to the system subgroup information 1 descrambles broadcast system information by using the SI-RNTI-1 obtained in advance, to obtain the information about the broadcast system subgroup information 1. UE in the user equipment group that corresponds to the system subgroup information 2 descrambles broadcast system information by using the SI-RNTI-2 obtained in advance, to obtain the information about the broadcast system subgroup information 2.

Certainly, in a case in which an objective of this embodiment of the present disclosure can be achieved, a person skilled in the art may also broadcast, to user equipment of each user equipment group by using another implementation manner, system subgroup information that corresponds to each user equipment group.

After receiving the system subgroup information of the user equipment group that includes the user equipment, the user equipment may execute the following operations.

When the user equipment is user equipment of a first cell (for example, a macro cell), the user equipment may determine, according to the system subgroup information, whether to trigger inter-frequency cell discovery and measurement. The first cell is a serving cell that broadcasts a system information and that is controlled by the base station. For example, when the user equipment finds that the system subgroup information indicates that an inter-frequency neighboring small cell exists, the user equipment triggers inter-frequency measurement. If the system subgroup information does not indicate that an inter-frequency neighboring small cell exists, the user equipment does not trigger inter-frequency measurement.

When the user equipment is D2D user equipment, the user equipment may determine, according to the system subgroup information, whether there is an available D2D resource.

When the user equipment is user equipment supporting a new carrier type (NCT), the user equipment may acquire, from a macro cell, co-coverage NCT system information according to the system subgroup information.

According to the description of the foregoing embodiment, it can be understood that, in the message broadcast method provided by this embodiment, a base station determines at least one piece of system subgroup information of system information of a first cell, where each piece of system subgroup information includes system information content that is applied to a user equipment group that corresponds to the system subgroup information; and broadcasts, to a user equipment group, the system subgroup information that corresponds to the user equipment group. In such a manner, system information broadcast is more targeted, and user equipment receives only system subgroup information related to the user equipment; therefore, unnecessary behavior is not triggered.

Figure 2:
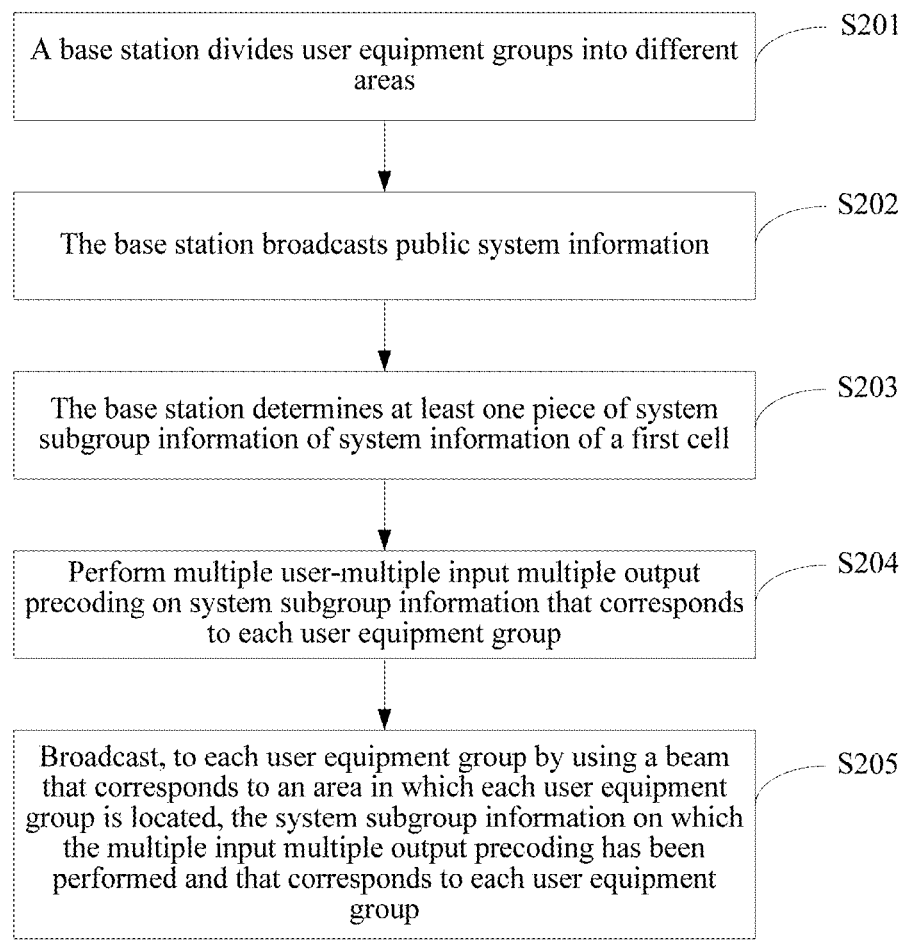
FIG. 2 is a flowchart of a second message broadcast method according to an embodiment of the present disclosure.

FIG. 2 is a flowchart of a second message broadcast method according to an embodiment of the present disclosure. The message broadcast method of this embodiment is described from the perspective of a base station. The message broadcast method of this embodiment includes the following steps.

The method shown in FIG. 2 includes S201: A base station divides user equipment groups into different areas.

The base station may divide user equipment groups in a control range of the base station into different areas.

In a specific implementation, a boundary line between areas may be determined by a macro base station according to a clustering status of a neighboring cell relationship. For example, if small cells are densely deployed in a particular area, the small cells may form an area there, where a user equipment group in the area is grouped into the area.

Further, alternatively, a boundary line between areas may be determined according to a quantity of user equipment. For example, when a quantity of user equipment in a particular area is relatively large, the boundary line may be set inward, that is, the area is set to be relatively small; when a quantity of user equipment is relatively small, the boundary line may be set outward, that is, the area is set to be relatively large, to accommodate more user equipment. A specific quantity of user equipment may be set according to an actual situation, and areas corresponding to different user equipment groups may be of continuous coverage, or may be of discrete coverage in a macro cell.

Area division may be static or may be semi-static. For example, user equipment A is fixedly grouped into an area 1, or user equipment A is grouped into an area 1 in a first time period, and is grouped into an area 2 or an area 3 in a second time period. A time interval between the first time period and the second time period is a particular preset value, for example, one month, three months or one year.

When an area in which a user equipment group is located changes, if system subgroup information that corresponds to the user equipment group is sent to user equipment of the user equipment group by using a beam, sending system subgroup information to the changed area by using a beam may be implemented by adjusting a beam width and a beam direction of a highly directional antenna.

The message broadcast method of this embodiment further includes: dividing user equipment into different user equipment groups.

The dividing user equipment into different user equipment groups may be implemented in the following manner: for example, dividing user equipment in different areas in a first cell into different user equipment groups; or dividing user equipment of different types in a first cell into different user equipment groups; or dividing user equipment that run different types of services in a first cell into different user equipment groups.

Certainly, the foregoing division of user equipment is exemplary only. The dividing user equipment into different user equipment groups may also be implemented in another manner as long as an objective of the present disclosure can be achieved.

The method shown in FIG. 2 includes S202: The base station broadcasts public system information.

The public system information may provide mapping information of configuration information and assistant identified fingerprint information corresponding to different system subgroup information. Herein, the configuration information corresponding to the system subgroup information is, for example, a quantity of antenna ports or precoding information. The assistant identified fingerprint information may be positioning information, or may be information (such as a frequency, a PCI or reference signal received power/reference signal received quality) of one to three neighboring and/or co-coverage cells.

The public system information may further include an identifier or a number of the system subgroup information.

The method shown in FIG. 2 includes S203: The base station determines at least one piece of system subgroup information of system information of a first cell.

Each piece of system subgroup information includes system information content that is applied to a user equipment group that corresponds to the system subgroup information. Specifically, system subgroup information that corresponds to each user equipment group includes at least one of: information about a small cell adjacent to an area in which the user equipment group is located, and radio resource information used for device-to-device communication connection. The first cell refers to a cell controlled by the base station, and the user equipment group is a group that includes at least one user equipment of the first cell.

For example, system subgroup information of a user equipment group 1 may include information about a small cell adjacent to an area in which the user equipment group 1 is located, and the information about a small cell may specifically include at least one of: a PCI, frequency information, dedicated reference signal information, channel state information reference signal information, a common physical configuration, and information about an SIB. The system subgroup information of the user equipment group 1 may further include available radio resource information used for D2D communication connection, and the radio resource information may include at least one of: an allocated resource, location information, and an interference level.

The system subgroup information that corresponds to each user equipment group is distinguished by using a PDSCH, or a PDSCH and an EPDCCH. For example, system subgroup information that corresponds to different user equipment groups uses different PDSCH resources, and different system subgroup information uses a same PDCCH resource; or different system subgroup information uses different EPDCCH resources; or different system subgroup information uses different PDSCH resources, and the different system subgroup information uses different code resources to scramble a PDCCH.

Further, the system subgroup information may further include an identifier or a number or a subgroup indication that indicates a system subgroup. The identifier or the number that corresponds to the system subgroup is used to identify different system subgroup information, and the subgroup indication is used to indicate a correspondence among the system subgroup information, a user equipment group, and an area in which the user equipment group is located.

The step of determining, by the base station, at least one piece of system subgroup information of system information of a first cell may be implemented by configuring at least one parameter of a demodulation reference signal, a scrambling code sequence index, an antenna port, and precoding. The precoding may be precoding predefined by using a CRS.

Configuration of these parameters may be static or may be semi-static. For example, a smoothed value of a long period, for example, an average value or a weighted average value, may be obtained according to reference signal received power/reference signal received quality that is reported by UE in connected mode in the area in which the user equipment group is located, or may be set for reporting of CSI.

The method shown in FIG. 2 includes S204: Perform multiple user-multiple input multiple output precoding on system subgroup information that corresponds to each user equipment group.

When system subgroup information is broadcast by using a beam that is formed by the highly directional antenna, there may be interference among system subgroup information that corresponds to different user equipment groups. Therefore, before system subgroup information is broadcast by using the beam, multiple user-multiple input multiple output (MU-MIMO) precoding may be performed first on system subgroup information that corresponds to each user equipment group, and after the precoding is completed, system subgroup information on which the precoding has been performed is broadcast by using the beam.

The method shown in FIG. 2 includes S205: Broadcast, to each user equipment group by using a beam that corresponds to an area in which each user equipment group is located, the system subgroup information on which the multiple input multiple output precoding has been performed and that corresponds to each user equipment group.

Before broadcasting the system subgroup information on which the multiple input multiple output precoding has been performed by using a beam, the base station sets a beam width and a beam direction of a highly directional antenna according to location information of the area in which each user equipment group is located, so that a beam formed by the highly directional antenna can cover an area that corresponds to the beam.

Specifically, the base station acquires the location information of the area in which the user equipment group is located, and then sets, according to the location information of the area, the beam width and the beam direction of the highly directional antenna by using a beamforming algorithm. Beam widths and beam directions of highly directional antennas that correspond to different hotspot areas are different. A beam corresponding to the beam width and the beam direction may cover the area. The location information may be as follows: an area, a shape, an azimuth, or the like of at least one area.

The base station may cover at least two areas by using at least two beams that are formed by the highly directional antenna.

A beam formed by the highly directional antenna provides multiple physical channels, for example, a common control channel and a traffic channel, that correspond to the system subgroup information of the area in which the user equipment group is located.

In addition, further, a quantity of highly directional antennas may be flexibly set according to a quantity of areas that need a particular piece of system subgroup information. If a quantity of areas in which broadcasting needs to be performed is relatively small, the base station may set a quantity of highly directional antennas according to location information of the areas.

For example, if the quantity is relatively small, the base station may set a beam width and a beam direction of a highly directional antenna according to location information of the areas, and provide, by using the highly directional antenna, a particular piece of system subgroup information for all areas that need the system subgroup information.

Figure 3:
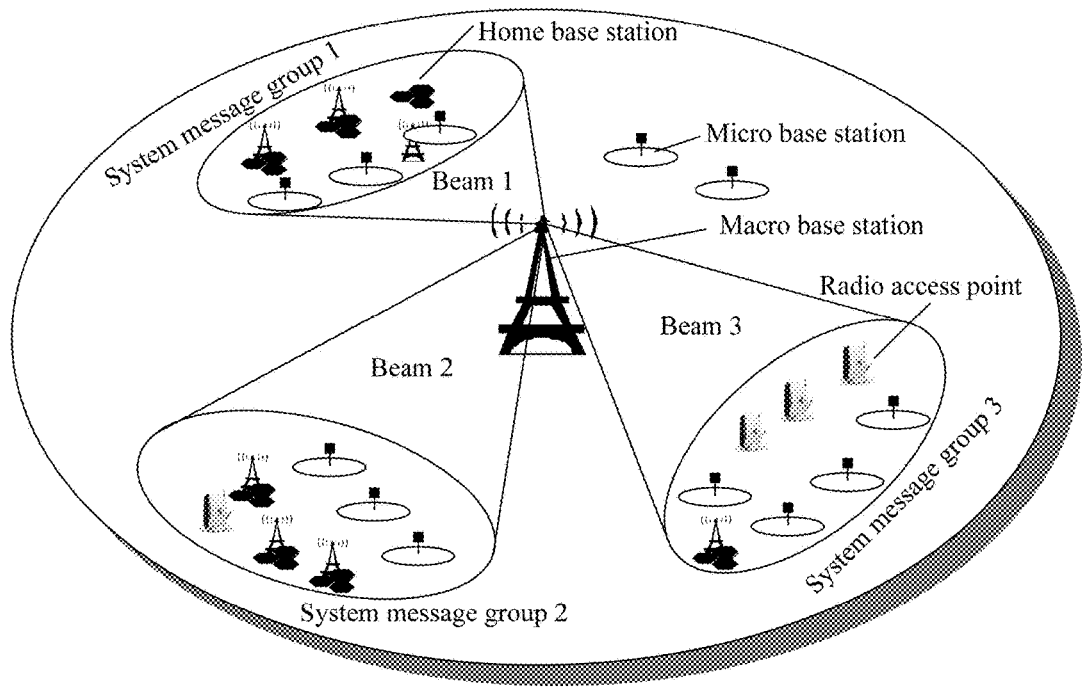
FIG. 3 is a schematic diagram of an array antenna according to an embodiment of the present disclosure.

If the quantity is relatively large, the base station may set a beam width and a beam direction of a highly directional antenna according to location information, different highly directional antennas provide corresponding system subgroup information for different areas, and resources may be flexibly allocated among multiple highly directional antennas. For example, in an embodiment, if a quantity of areas is four, beam widths and beam directions of two highly directional antennas may be set according to location information of the four areas, so that each highly directional antenna separately provides system subgroup information for two areas. For example, FIG. 3 is a schematic diagram of an array antenna according to an embodiment of the present disclosure.

A highly directional antenna may be an array antenna, and certainly, may be an antenna of another type. For example, when a signal frequency is relatively high, for example, in a microwave frequency band, the highly directional antenna may be a parabolic antenna. When a linear array is used, because no beam is formed in a vertical direction, a sector micro cell may be formed. When a planar array is used, which may be an 8×4 uniform planar array of 32 array elements, relatively narrow beams may be formed in both horizontal and vertical directions, that is, 3D beamforming is performed; in other words, beams are formed in both the horizontal and vertical directions, so that area coverage may be better generated. In addition, a circular array and a three-dimensional grid array antenna may also implement 3D beamforming.

Corresponding system subgroup information on which precoding has been performed is respectively broadcast to user equipment of multiple user equipment groups by using a beam formed by a highly directional antenna. In this embodiment, a proper precoding vector is preset, so that interference among system subgroup information of multiple user equipment groups can be eliminated, and a capacity of a communications system can be further improved.

User equipment may correspondingly receive, by using precoding information acquired from public system information, system subgroup information on which precoding has been performed and that corresponds to an area in which a user equipment group is located, and executes a subsequent operation according to the system subgroup information.

For example, when the user equipment is user equipment of a first cell (for example, a macro cell), the user equipment may determine, according to the system subgroup information, whether to trigger inter-frequency cell discovery and measurement.

When the user equipment is D2D user equipment, the user equipment may determine, according to the system subgroup information, whether there is an available D2D resource.

When the user equipment is user equipment supporting a new carrier type (NCT), the user equipment may acquire, from a macro cell, co-coverage NCT system information according to the system subgroup information.

Figure 4:
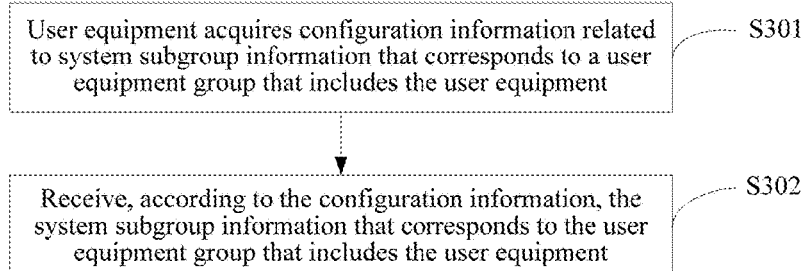
FIG. 4 is a flowchart of a third message broadcast method according to an embodiment of the present disclosure.

FIG. 4 is a flowchart of a third message broadcast method according to an embodiment of the present disclosure. This embodiment is described from the perspective of user equipment. The message broadcast method of this embodiment includes the following.

The method shown in FIG. 4 includes S301: User equipment acquires configuration information related to system subgroup information that corresponds to a user equipment group that includes the user equipment.

The base station broadcasts, to user equipment of each user equipment group, system subgroup information that corresponds to the user equipment group. The user equipment needs to acquire in advance the configuration information related to the system subgroup information that corresponds to the user equipment group that includes the user equipment, so as to receive the corresponding system subgroup information.

The user equipment in connected mode may acquire, by using dedicated information, the configuration information related to the system subgroup information that corresponds to the user equipment group that includes the user equipment. The user equipment in idle mode may acquire, by using a message in a process of temporary interaction between the user equipment and a network, for example, a radio resource control (RRC) release message of an attach procedure, the configuration information related to the system subgroup information that corresponds to the user equipment group that includes the user equipment.

Herein, the configuration information related to the system subgroup information may include a quantity of antenna ports or precoding information.

The method shown in FIG. 4 includes S302: Receive, according to the configuration information, the system subgroup information that corresponds to the user equipment group that includes the user equipment.

The user equipment receives, according to the acquired configuration information, the system subgroup information that corresponds to the user equipment group that includes the user equipment. After receiving the system subgroup information, the user equipment may determine, according to the system subgroup information, whether to execute a further operation.

For example, user equipment of a macro cell may determine, according to received system subgroup information, whether to trigger inter-frequency cell discovery and measurement.

D2D user equipment D2D may determine, according to received system subgroup information, whether there is an available D2D resource.

For user equipment supporting an NCT, the user equipment may acquire co-coverage NCT system information according to received system subgroup information. Because for the user equipment supporting an NCT, an NCT cell is preferably selected to receive a service, if system information of a camped serving cell indicates that a co-coverage NCT cell exists, handover to the NCT cell is triggered. However, coverage of the NCT cell is relatively small; if broadcasting is performed in the entire cell, the user equipment supporting an NCT may trigger useless measurement and handover.

Figure 5:
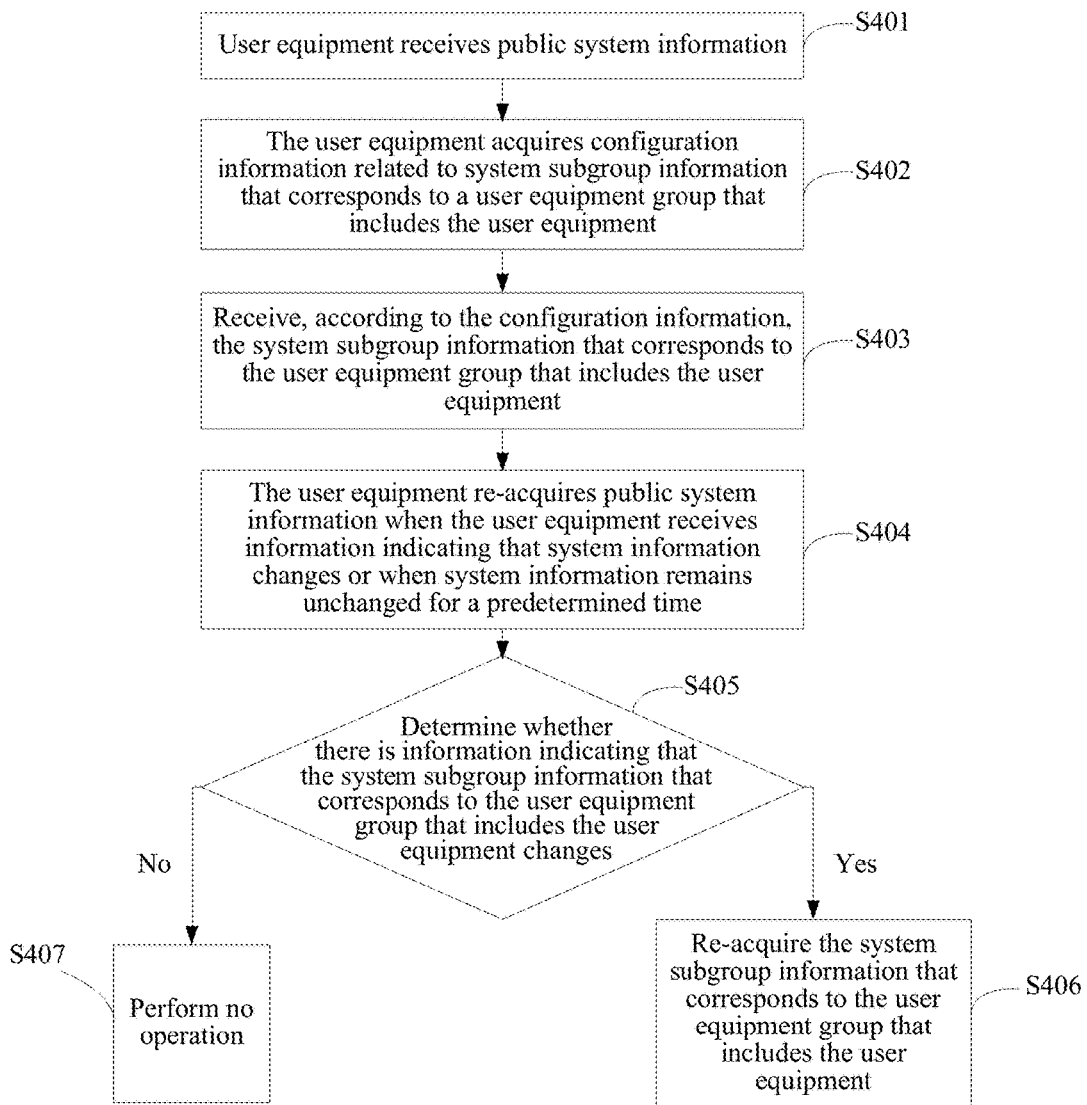
FIG. 5 is a flowchart of a fourth message broadcast method according to an embodiment of the present disclosure.

FIG. 5 is a flowchart of a fourth message broadcast method according to an embodiment of the present disclosure. This embodiment is described from the perspective of user equipment. The message broadcast method of this embodiment includes the following.

The method shown in FIG. 5 includes S401: User equipment receives public system information.

A base station broadcasts in advance public system information to all user equipment, and the user equipment receive the public system information.

The public system information may provide mapping information of configuration information and assistant identified fingerprint information corresponding to different system subgroup information. Herein, the configuration information corresponding to the system subgroup information is, for example, a quantity of antenna ports or precoding information. The assistant identified fingerprint information may be positioning information, or may be information (such as a frequency, a PCI or reference signal received power/reference signal received quality) of one to three neighboring and/or co-coverage cells.

The public system information may further include an identifier or a number of the system subgroup information.

The method shown in FIG. 5 includes S402: The user equipment acquires configuration information related to system subgroup information that corresponds to a user equipment group that includes the user equipment.

The base station broadcasts, to user equipment of each user equipment group, system subgroup information that corresponds to the user equipment group. The user equipment needs to acquire in advance the configuration information related to the system subgroup information that corresponds to the user equipment group that includes the user equipment, so as to receive the corresponding system subgroup information.

The user equipment in connected mode may acquire, by using dedicated information, the configuration information related to the system subgroup information that corresponds to the user equipment group that includes the user equipment. The user equipment in idle mode may acquire, by using an RRC release message of an attach procedure, the configuration information related to the system subgroup information that corresponds to the user equipment group that includes the user equipment.

Herein, the configuration information related to the system subgroup information may include a quantity of antenna ports or precoding information.

The method shown in FIG. 5 includes S403: Receive, according to the configuration information, the system subgroup information that corresponds to the user equipment group that includes the user equipment.

The user equipment receives, according to the acquired configuration information, the system subgroup information that corresponds to the user equipment group that includes the user equipment. After receiving the system subgroup information, the user equipment may determine, according to the system subgroup information, whether to execute a further operation.

For example, user equipment of a macro cell may determine, according to received system subgroup information, whether to trigger inter-frequency cell discovery and measurement.

D2D user equipment may determine, according to received system subgroup information, whether there is an available D2D resource.

For user equipment supporting an NCT, the user equipment may acquire co-coverage NCT system information according to received system subgroup information.

The method shown in FIG. 5 includes S404: The user equipment re-acquires public system information when the user equipment receives information indicating that system information changes or when system information remains unchanged for a predetermined time.

The system information does not always remain unchanged. From the perspective of the user equipment, if the system information remains unchanged for a long period of time (for example: 3 hours), the user equipment may try to re-acquire the system information. In addition, if system information of a network side changes, the network side needs to notify the user equipment to update the system information. User equipment in either connected mode or idle mode may be notified by paging. However, the system information does not change at any time, but is updated in a specified radio frame. Therefore, a concept of a modification period is introduced. System information content in the modification period cannot change, and the system information can be modified only from a start moment of a next modification period. That is, when it is learned that the system information changes, new system information is listened to at the start moment of the next modification period, to re-acquire system information.

Two notification manners for a change in system information in Long Term Evolution (LTE) are as follows: First, a network side notifies, by using a paging message that carries content indicating that system information changes, user equipment in idle mode and in connected mode that the system information changes, and the user equipment listen to new system information when a next modification period starts. Second, SIB1 carries information about a change tag of system information, and if a change tag read by user equipment is different from a change tag stored before, it indicates that the system information changes, and system information needs to be reread; and a validity period for which the user equipment stores system information is 3 hours, if the time period expires, the user equipment needs to reread system information.

When system information remains unchanged for a predetermined time (e.g., 3 hours), or when the user equipment receives paging information or other information that indicates that the system information changes, the user equipment re-acquires the public system information.

The method shown in FIG. 5 includes S405: Determine whether there is information indicating that the system subgroup information that corresponds to the user equipment group that includes the user equipment changes.

After the public system information is re-acquired, it may be further determined, according to the re-acquired public system information or information indicating that system information changes, whether there is information indicating that the system subgroup information that corresponds to the user equipment group that includes the user equipment changes; therefore, it is determined whether corresponding system subgroup information needs to be re-acquired.

In another case, when the user equipment moves, it also needs to be determined, according to the foregoing determining, whether the system subgroup information needs to be re-acquired.

When there is information indicating that the system subgroup information that corresponds to the user equipment group that includes the user equipment changes, it is determined that the corresponding system subgroup information needs to be further re-acquired, and S406 is performed; otherwise, S407 is performed.

The method shown in FIG. 5 includes S406: Re-acquire system subgroup information that corresponds to the user equipment group that includes the user equipment.

When the system subgroup information that corresponds to the user equipment group needs to be re-acquired, the user equipment re-acquires system subgroup information that corresponds to the user equipment group that includes the user equipment.

The method shown in FIG. 5 includes S407: Execute no operation.

When the system subgroup information that corresponds to the user equipment group does not need to be re-acquired, the user equipment executes no operation.

After the user equipment receives the system subgroup information that corresponds to the area in which the user equipment is located and/or after the re-acquiring system subgroup information that corresponds to the user equipment group that includes the user equipment, the user equipment may further determine a subsequent operation according to the system subgroup information.

For example, user equipment of a macro cell may determine, according to the system subgroup information, whether to trigger inter-frequency cell discovery and measurement.

D2D user equipment may determine, according to the system subgroup information, whether there is an available D2D resource.

User equipment supporting an NCT may acquire, from a macro cell, co-coverage NCT system information according to the system subgroup information.

According to elaboration of the foregoing embodiment, user equipment acquires configuration information related to system subgroup information that corresponds to a user equipment group that includes the user equipment, acquires, according to the related configuration information, the system subgroup information that corresponds to the user equipment group that includes the user equipment, and can determine, according to the system subgroup information, whether to execute a further operation. In such a manner, system information broadcast is more targeted, and user equipment receives only system subgroup information related to the user equipment; therefore, unnecessary behavior is not triggered.

Figure 6:
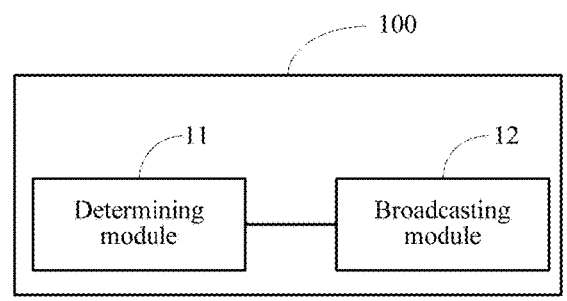
FIG. 6 is a schematic diagram of a structure of a first base station according to an embodiment of the present disclosure.

FIG. 6 is a schematic diagram of a structure of a first base station according to an embodiment of the present disclosure. A base station 100 of this embodiment includes a determining module 11 and a broadcasting module 12.

The determining module 11 is configured to determine at least one piece of system subgroup information of system information of a first cell, where each piece of system subgroup information includes system information content that is applied to a user equipment group that corresponds to the system subgroup information, where the first cell refers to a cell controlled by the base station, and the user equipment group is a group that includes at least one user equipment of the first cell.

Each piece of system subgroup information includes system information content that is applied to a user equipment group that corresponds to the system subgroup information. Specifically, system subgroup information that corresponds to each user equipment group includes at least one of: information about a small cell adjacent to an area in which the user equipment group is located, and radio resource information used for device-to-device communication connection. The first cell refers to a cell controlled by the base station, and the user equipment group is a group that includes at least one user equipment of the first cell.

For example, system subgroup information of a user equipment group 1 may include information about a small cell adjacent to an area in which the user equipment group 1 is located, and the information about a small cell may include at least one of: a PCI, frequency information, dedicated reference signal information, channel state information reference signal information, a common physical configuration, and information about an SIB. The system subgroup information of the user equipment group 1 may further include available radio resource information used for D2D communication connection, and the radio resource information may include at least one of: an allocated resource, location information, and an interference level.

The system subgroup information that corresponds to each user equipment group is distinguished by using a PDSCH, or a PDSCH and an EPDCCH. For example, system subgroup information that corresponds to different user equipment groups uses different PDSCH resources, and different system subgroup information uses a same PDCCH resource; or different system subgroup information uses different EPDCCH resources; or different system subgroup information uses different PDSCH resources, and the different system subgroup information uses different code resources to scramble a PDCCH.

Further, the system subgroup information may further include an identifier or a number or a subgroup indication that indicates a system subgroup. The identifier or the number that corresponds to the system subgroup is used to identify different system subgroup information, and the subgroup indication is used to indicate a correspondence among the system subgroup information, a user equipment group, and an area in which the user equipment group is located.

Specifically, the determining, by the determining module 11, at least one piece of system subgroup information of system information of a first cell may be implemented by configuring at least one parameter of a demodulation reference signal, a scrambling code sequence index, an antenna port, and precoding. The precoding may use a predefined CRS.

Configuration of these parameters may be static or may be semi-static. For example, a smoothed value of a long period, for example, an average value or a weighted average value, may be obtained according to reference signal received power/reference signal received quality that is reported by UE in connected mode in the area in which the user equipment group is located, or may be set for reporting of CSI.

The broadcasting module 12 is configured to broadcast, to the user equipment group according to the at least one piece of system subgroup information of the system information of the first cell that is determined by the determining module 11, the system subgroup information that corresponds to the user equipment group.

The broadcasting module 12 broadcasts, to the user equipment group, the system subgroup information that corresponds to the user equipment group. For example, the base station broadcasts system subgroup information 1 to user equipment of the user equipment group 1 by using the broadcasting module 12, and respectively broadcasts system subgroup information 2 and system subgroup information 3 to user equipment groups 2 and 3, where the system subgroup information 1 includes system information content that is applied to the user equipment group 1, the system subgroup information 2 includes system information content that is applied to the user equipment group 2, and the system subgroup information 3 includes system information content that is applied to the user equipment group 3.

In this embodiment, a specific implementation manner of broadcasting, to a user equipment group by the base station by using the broadcasting module 12, system subgroup information that corresponds to the user equipment group may include the following.

First, the broadcasting module 12 broadcasts, to user equipment of each user equipment group by using a beam that corresponds to an area in which the user equipment group is located, the system subgroup information that corresponds to the user equipment group.

For example, system subgroup information 1 is broadcast by using a beam 1, and system subgroup information 2 and system subgroup information 3 are respectively broadcast by using beams 2 and 3. A beam width and a beam direction of the beam 1 may cover an area in which the user equipment group 1 is located, and a beam width and a beam direction of the beam 2 and those of the beam 3 may respectively cover areas in which user equipment groups 2 and 3 are located.

Second, the broadcasting module 12 broadcasts, to user equipment of each user equipment group by using a system information radio network temporary identifier (SI-RNTI) that corresponds to the area in which each user equipment group is located, system subgroup information that corresponds to each user equipment group, where the system subgroup information that corresponds to each user equipment group corresponds to a different system information radio network temporary identifier.

Certainly, in a case in which an objective of this embodiment of the present disclosure can be achieved, a person skilled in the art may also broadcast, to user equipment of each user equipment group by using another implementation manner, system subgroup information that corresponds to each user equipment group.

The broadcasting module 12 is further configured to broadcast public system information, where the public system information includes configuration information that corresponds to the system subgroup information and assistant identified fingerprint information.

The public system information may provide mapping information of configuration information and assistant identified fingerprint information corresponding to different system subgroup information. Herein, the configuration information corresponding to the system subgroup information is, for example, a quantity of antenna ports or precoding information. The assistant identified fingerprint information may be positioning information, or may be information (such as a frequency, a PCI or reference signal received power/reference signal received quality) of one to three neighboring and/or co-coverage cells.

The public system information may further include an identifier or a number of the system subgroup information.

The base station according to this embodiment can execute the steps in the message broadcast method in the foregoing embodiment shown in FIG. 1, division of functional modules of the base station of this embodiment are exemplary only. Based on a case in which an objective of the present disclosure can be achieved, division of the functional modules thereof is not limited to the foregoing manners, and the division may be performed by using any other possible implementation manners. For example, multiple units or components may be combined or may be integrated into another system, or some features may be ignored, or may not be executed.

Figure 7:
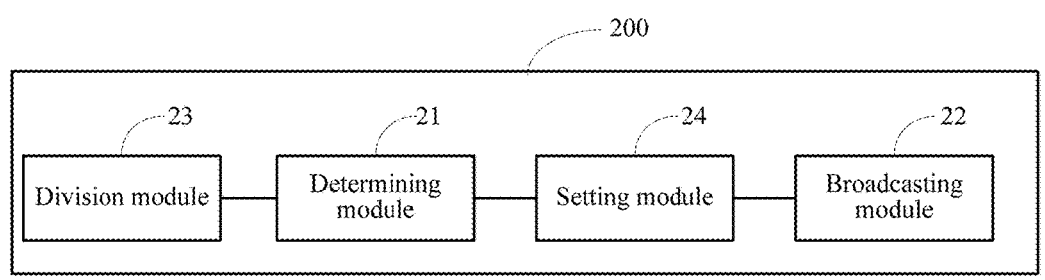
FIG. 7 is a schematic diagram of a structure of a second base station according to an embodiment of the present disclosure.

FIG. 7 is a schematic diagram of a structure of a second base station according to an embodiment of the present disclosure. A base station 200 of this embodiment includes a determining module 21, a broadcasting module 22, a division module 23, and a setting module 24.

The determining module 21 is configured to determine at least one piece of system subgroup information of system information of a first cell, where each piece of system subgroup information includes system information content that is applied to a user equipment group that corresponds to the system subgroup information, where the first cell refers to a cell controlled by the base station, and the user equipment group is a group that includes at least one user equipment of the first cell.

The broadcasting module 22 is configured to broadcast, to the user equipment group according to the at least one piece of system subgroup information of the system information of the first cell that is determined by the determining module 21, the system subgroup information that corresponds to the user equipment group.

Specific implementations of functions of the determining module 21 and the broadcasting module 22 are basically the same as those described in Embodiment 6. Refer to detailed descriptions of the embodiment shown in FIG. 6, and details are not described herein again.

The division module 23 is configured to divide user equipment into different user equipment groups. The division module 23 may divide user equipment in different areas in the first cell into different user equipment groups; or divide user equipment of different types in the first cell into different user equipment groups; or divide user equipment that run different types of services in the first cell into different user equipment groups.

The division module 23 is configured to divide user equipment groups into different areas according to a clustering status of a neighboring cell relationship; or is configured to divide user equipment groups into different areas according to a quantity of user equipment.

The base station may group, by using the division module 23, user equipment groups in a control range of the base station into different areas.

In a specific implementation, a boundary line between areas may be determined according to a clustering status of a neighboring cell relationship. For example, if small cells are densely deployed in a particular area, the small cells may form an area there, where user equipment in the area is grouped into the area.

Further, alternatively, a boundary line between areas may be determined according to a quantity of user equipment. For example, when a quantity of user equipment in a particular area is relatively large, the boundary line may be set inward, that is, the area is set to be relatively small; when a quantity of user equipment is relatively small, the boundary line may be set outward, that is, the area is set to be relatively large, to accommodate more user equipment. A specific quantity of user equipment may be set according to an actual situation, and areas corresponding to different user equipment groups may be of continuous coverage, or may be of discrete coverage in a macro cell.

Area division may be static or may be semi-static. For example, user equipment A is fixedly grouped into an area 1, or user equipment A is grouped into an area 1 in a first time period, and is grouped into an area 2 or an area 3 in a second time period. A time interval between the first time period and the second time period is a particular preset value, for example, one month, three months or one year.

When an area in which a user equipment group is located changes, if system subgroup information that corresponds to the user equipment group is sent to user equipment of the user equipment group by using a beam, the setting module 24 may implement, by adjusting a beam width and a beam direction of a highly directional antenna, sending system subgroup information to the changed area by using a beam.

When the broadcasting module 22 broadcasts, to user equipment of each user equipment group by using a beam that corresponds to an area in which each user equipment group is located, system subgroup information that corresponds to each user equipment group, the setting module 24 is configured to set a beam width and a beam direction of a highly directional antenna according to location information of the area in which each user equipment group is located, so that a beam formed by the highly directional antenna can cover the area that corresponds to the beam. The broadcasting module 22 broadcasts corresponding system subgroup information by using the beam that is formed by the highly directional antenna set by the setting module 24.

Specifically, the setting module 24 acquires the location information of the area in which the user equipment group is located, and then sets, according to the location information of the area, the beam width and the beam direction of the highly directional antenna by using a beamforming algorithm. Beam widths and beam directions of highly directional antennas that correspond to different hotspot areas are different. A beam corresponding to the beam width and the beam direction may cover the area. The location information may be as follows: an area, a shape, an azimuth, or the like of at least one area.

The base station may cover at least two areas by using at least two beams that are formed by the highly directional antenna.

A beam formed by the highly directional antenna provides multiple physical channels, for example, a common control channel and a traffic channel, that correspond to the system subgroup information of the area in which the user equipment group is located.

In addition, further, the setting module 24 may flexibly set a quantity of highly directional antennas according to a quantity of areas that need a particular piece of system subgroup information. If the quantity of areas that needs the system subgroup information is relatively small, the base station may set a quantity of highly directional antennas according to location information of the areas.

For example, if the quantity is relatively small, the setting module 24 may set a beam width and a beam direction of a highly directional antenna according to location information of the areas, and provide, by using the highly directional antenna, a particular piece of system subgroup information for all areas that need the system subgroup information.

If the quantity is relatively large, the setting module 24 may set a beam width and a beam direction of a highly directional antenna according to location information, different highly directional antennas provide corresponding system subgroup information for different areas, and resources may be flexibly allocated among multiple highly directional antennas. For example, in an embodiment, if a quantity of areas is four, beam widths and beam directions of two highly directional antennas may be set according to location information of the four areas, so that each highly directional antenna separately provides system subgroup information for two areas.

A highly directional antenna may be an array antenna, and certainly, may be an antenna of another type. For example, when a signal frequency is relatively high, for example, in a microwave frequency band, the highly directional antenna may be a parabolic antenna. When a linear array is used, because no beam is formed in a vertical direction, a sector micro cell may be formed. When a planar array is used, which may be an 8×4 uniform planar array of 32 array elements, relatively narrow beams may be formed in both horizontal and vertical directions, that is, 3D beamforming is performed. In other words, beams are formed in both the horizontal and vertical directions, so that area coverage may be better generated. In addition, a circular array and a three-dimensional grid array antenna may also implement 3D beamforming.

When the broadcasting module 22 broadcasts system subgroup information by using a beam that is formed by the highly directional antenna, there may be interference among system subgroup information that corresponds to different user equipment groups. Therefore, before broadcasting system subgroup information by using the beam, the broadcasting module 22 may first perform multiple user-multiple input multiple output (MU-MIMO) precoding on system subgroup information that corresponds to each user equipment group, and after the precoding is completed, broadcast, by using the beam, system subgroup information on which the precoding has been performed.

The broadcasting module 22 respectively broadcasts corresponding system subgroup information on which precoding has been performed to user equipment of multiple user equipment groups by using a beam formed by a highly directional antenna. In this embodiment, the broadcasting module 22 presets a proper precoding vector, so that interference among system subgroup information of multiple user equipment groups can be eliminated, and a capacity of a communications system can be further improved.

User equipment may correspondingly receive, by using precoding information acquired from public system information, system subgroup information on which precoding has been performed and that corresponds to an area in which a user equipment group is located, and executes a subsequent operation according to the system subgroup information.

For example, when the user equipment is user equipment of a first cell (for example, a macro cell), the user equipment may determine, according to the system subgroup information, whether to trigger inter-frequency cell discovery and measurement.

When the user equipment is D2D user equipment, the user equipment may determine, according to the system subgroup information, whether there is an available D2D resource.

When the user equipment is user equipment supporting an NCT, the user equipment may acquire, from a macro cell, co-coverage NCT system information according to the system subgroup information.

The base station according to this embodiment can implement the steps in the message broadcast method in the foregoing embodiment shown in FIG. 2, and the implementation of the modules and functions thereof are only exemplarily described in this embodiment of the present disclosure. Based on a case in which an objective of the present disclosure can be achieved, division of the functional modules thereof is not limited to the foregoing manners, and the division may be performed by using any other possible implementation manners. For example, multiple units or components may be combined or may be integrated into another system, or some features may be ignored, or may not be executed.

Figure 8:
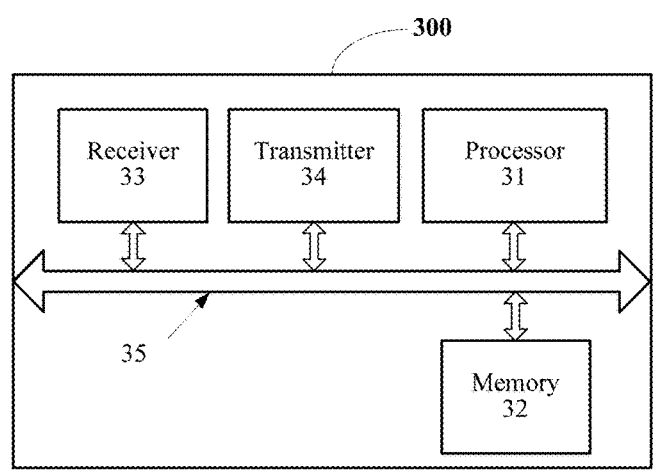
FIG. 8 is a schematic diagram of a structure of a third base station according to an embodiment of the present disclosure.

FIG. 8 is a schematic diagram of a structure of a third base station according to an embodiment of the present disclosure. A base station 300 of this embodiment includes a processor 31, a memory 32, a receiver 33, a transmitter 34, and a bus system 35.

The processor 31 controls an operation of the base station 300. The processor 31 may also be referred to as a central processing unit (CPU). The processor 31 may be an integrated circuit chip and has a signal processing capability. The processor 31 may also be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 32 may include a read-only memory and a random access memory, and provides an instruction and data to the processor 31. A part of the memory 32 may further include a non-volatile random access memory (NVRAM).

Components of the base station 300 are coupled together by using the bus system 35, where in addition to a data bus, the bus system 35 may further include a power bus, a control bus, a status signal bus, and the like. However, for clear description, various types of buses in the figure are marked as the bus system 35.

The memory 32 stores the following elements, executable modules or data structures, or a subset thereof, or an extended set thereof. Operation instructions, including various operation instructions, used to implement various operations; and an operating system, including various system programs, used to implement various fundamental services and process hardware-based tasks.

In this embodiment of the present disclosure, the processor 31 performs, by invoking the operation instructions (where the operation instructions may be stored in the operating system) stored in the memory 32, the following operations.

Determining, by the processor 31, at least one piece of system subgroup information of system information of a first cell, where each piece of system subgroup information includes system information content that is applied to a user equipment group that corresponds to the system subgroup information. Controlling the transmitter 34 to broadcast, to the user equipment group, the system subgroup information that corresponds to the user equipment group, where the first cell refers to a cell controlled by the base station, and the user equipment group is a group that includes at least one user equipment of the first cell.

The processor 31 is further configured to control the receiver 33 to receive communication data from a network.

The memory 32 is further configured to store system subgroup information that corresponds to each user equipment group.

Each piece of system subgroup information includes system information content that is applied to a user equipment group that corresponds to the system subgroup information. Specifically, the system subgroup information that corresponds to each user equipment group includes at least one of: information about a small cell adjacent to an area in which the user equipment group is located, and radio resource information used for device-to-device communication connection. The first cell refers to a cell controlled by the base station, and the user equipment group is a group that includes at least one user equipment of the first cell.

For example, system subgroup information of a user equipment group 1 may include information about a small cell adjacent to an area in which the user equipment group 1 is located, and the information about a small cell may include at least one of: a PCI, frequency information, dedicated reference signal information, channel state information reference signal information, a common physical configuration, and information about an SIB. The system subgroup information of the user equipment group 1 may further include available radio resource information used for D2D communication connection, and the radio resource information may include at least one of: an allocated resource, location information, and an interference level.

The system subgroup information that corresponds to each user equipment group is distinguished by using a PDSCH, or a PDSCH and an EPDCCH. For example, system subgroup information that corresponds to different user equipment groups uses different PDSCH resources, and different system subgroup information uses a same PDCCH resource; or different system subgroup information uses different EPDCCH resources; or different system subgroup information uses different PDSCH resources, and the different system subgroup information uses different code resources to scramble a PDCCH.

Further, the system subgroup information may further include an identifier or a number or a subgroup indication that indicates a system subgroup. The identifier or the number that corresponds to the system subgroup is used to identify different system subgroup information, and the subgroup indication is used to indicate a correspondence among the system subgroup information, a user equipment group, and an area in which the user equipment group is located.

Specifically, the determining, by the processor 31, at least one piece of system subgroup information of system information of a first cell may be implemented by configuring at least one parameter of a demodulation reference signal, a scrambling code sequence index, an antenna port, and precoding. The precoding may use a predefined CRS.

Configuration of these parameters may be static or may be semi-static. For example, a smoothed value of a long period, for example, an average value or a weighted average value, may be obtained according to reference signal received power/reference signal received quality that is reported by UE in connected mode in the area in which the user equipment group is located, or may be set for reporting of CSI.

The processor 31 further controls the transmitter 34 to broadcast, to the user equipment group, the system subgroup information that corresponds to the user equipment group, for example, broadcast system subgroup information 1 to user equipment of the user equipment group 1, and respectively broadcast system subgroup information 2 and system subgroup information 3 to user equipment groups 2 and 3, where the system subgroup information 1 includes system information content that is applied to the user equipment group 1, the system subgroup information 2 includes system information content that is applied to the user equipment group 2, and the system subgroup information 3 includes system information content that is applied to the user equipment group 3.

Specifically, the processor 31 may broadcast, to user equipment of the user equipment group by using a beam that corresponds to an area in which each user equipment group is located, the system subgroup information that corresponds to the user equipment group; or broadcast, to user equipment of each user equipment group by using a system information radio network temporary identifier that corresponds to an area in which each user equipment group is located, the system subgroup information that corresponds to each user equipment group, where the system subgroup information that corresponds to each user equipment group corresponds to a different system information radio network temporary identifier.

Certainly, in a precondition in which an objective of the present disclosure can be achieved, the processor 31 may also broadcast, to user equipment of each user equipment group by using another implementation manner, system subgroup information that corresponds to each user equipment group.

When the processor 31 broadcasts corresponding system subgroup information by using a beam, the processor 31 may set a beam width and a beam direction of a highly directional antenna according to location information of the area in which each user equipment group is located, so that a beam formed by the highly directional antenna can cover an area that corresponds to the beam. The corresponding system subgroup information is broadcast by using the beam that is formed by the set highly directional antenna.

Specifically, the processor 31 acquires the location information of the area in which the user equipment group is located, and then sets, according to the location information of the area, the beam width and the beam direction of the highly directional antenna by using a beamforming algorithm. Beam widths and beam directions of highly directional antennas that correspond to different hotspot areas are different. A beam corresponding to the beam width and the beam direction may cover the area. The location information may be as follows: an area, a shape, an azimuth, or the like of at least one area.

The processor 31 may cover at least two areas by using at least two beams that are formed by the highly directional antenna.

A beam formed by the highly directional antenna provides multiple physical channels that correspond to the system subgroup information of the area, for example, a common control channel and a traffic channel.

In addition, further, the processor 31 may flexibly set a quantity of highly directional antennas according to a quantity of areas that need a particular piece of system subgroup information. If the quantity of areas that needs the system subgroup information is relatively small, the base station may set a quantity of highly directional antennas according to location information of the areas.

For example, if the quantity is relatively small, the processor 31 may set a beam width and a beam direction of a highly directional antenna according to location information of the areas, and provide, by using the highly directional antenna, a particular piece of system subgroup information for all areas that need the system subgroup information.

If the quantity is relatively large, the processor 31 may set a beam width and a beam direction of a highly directional antenna according to location information, different highly directional antennas provide corresponding system subgroup information for different areas, and resources may be flexibly allocated among multiple highly directional antennas. For example, in an embodiment, if a quantity of areas is four, beam widths and beam directions of two highly directional antennas may be set according to location information of the four areas, so that each highly directional antenna separately provides system subgroup information for two areas.

A highly directional antenna may be an array antenna, and certainly, may be an antenna of another type. For example, when an signal frequency is relatively high, for example, in a microwave frequency band, the highly directional antenna may be a parabolic antenna. When a linear array is used, because no beam is formed in a vertical direction, a sector micro cell may be formed. When a planar array is used, which may be an 8×4 uniform planar array of 32 array elements, relatively narrow beams may be formed in both horizontal and vertical directions, that is, 3D beamforming is performed. In other words, beams are formed in both the horizontal and vertical directions, so that area coverage may be better generated. In addition, a circular array and a three-dimensional grid array antenna may also implement 3D beamforming.

When system subgroup information is broadcast by using a beam that is performed by the highly directional antenna, there may be interference among system subgroup information that corresponds to different user equipment groups. Therefore, before broadcasting system subgroup information by using the beam, the processor 31 may first perform MU-MIMO precoding on system subgroup information that corresponds to each user equipment group, and after the precoding is completed, broadcast, by using the beam, system subgroup information on which the precoding has been performed.

In addition, the processor 31 is further configured to broadcast public system information, where the public system information includes configuration information that corresponds to the system subgroup information and assistant identified fingerprint information.

The public system information may provide mapping information of configuration information and assistant identified fingerprint information corresponding to different system subgroup information. Herein, the configuration information corresponding to the system subgroup information is, for example, a quantity of antenna ports or precoding information. The assistant identified fingerprint information may be positioning information, or may be information (such as a frequency, a PCI or reference signal received power/reference signal received quality) of one to three neighboring and/or co-coverage cells.

The public system information may further include an identifier or a number of the system subgroup information.

In another embodiment, the processor 31 is further configured to divide user equipment into different user equipment groups. The processor 31 may divide user equipment in different areas in the first cell into different user equipment groups; or divide user equipment of different types in the first cell into different user equipment groups; or divide user equipment that run different types of services in the first cell into different user equipment groups.

In another embodiment, the processor 31 may further divide the user equipment groups into different areas according to a clustering status of a neighboring cell relationship; or group the user equipment groups into different areas according to a quantity of user equipment.

The processor 31 may divide user equipment in a control range of the base station into different areas. In a specific implementation, a boundary line between areas may be determined according to a clustering status of a neighboring cell relationship. For example, if small cells are densely deployed in a particular area, the small cells may form an area there, where user equipment in the area is grouped into the area.

Further, alternatively, a boundary line between areas may be determined according to a quantity of user equipment. For example, when a quantity of user equipment in a particular area is relatively large, the boundary line may be set inward, that is, the area is set to be relatively small. When a quantity of user equipment is relatively small, the boundary line may be set outward, that is, the area is set to be relatively large, to accommodate more user equipment. A specific quantity of user equipment may be set according to an actual situation, and areas corresponding to different user equipment groups may be of continuous coverage, or may be of discrete coverage in a macro cell.

Area division may be static or may be semi-static. For example, user equipment A is fixedly grouped into an area 1, or user equipment A is grouped into an area 1 in a first time period, and is grouped into an area 2 or an area 3 in a second time period. A time interval between the first time period and the second time period is a particular preset value, for example, one month, three months or one year.

When an area in which a user equipment group is located changes, if system subgroup information that corresponds to the user equipment group is sent to user equipment of the user equipment group by using a beam, the processor 31 may implement, by adjusting a beam width and a beam direction of a highly directional antenna, sending system subgroup information to the changed area by using a beam.

The methods disclosed in the embodiments of the present disclosure may be applied to the processor 31, or are implemented by the processor 31. In an implementation process, steps of the foregoing methods may be performed by using an integrated logic circuit of hardware in the processor 31 or an instruction in a form of software. The processor 31 may implement or execute methods, steps, and logical block diagrams disclosed in the embodiments of the present disclosure. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically-erasable programmable memory or a register. The storage medium is located in the memory 32, and the processor 31 reads information in the memory 32 and completes the steps in the foregoing methods in combination with hardware of the processor 31.

Figure 9:
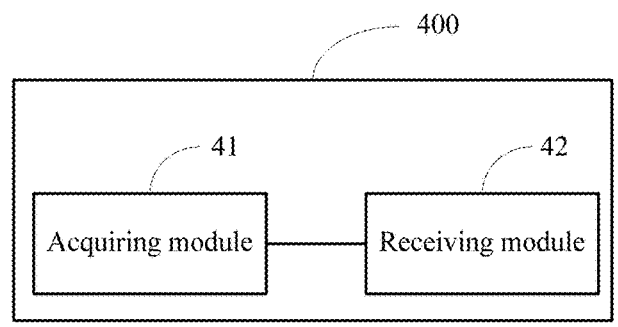
FIG. 9 is a schematic diagram of a structure of first user equipment according to an embodiment of the present disclosure.

FIG. 9 is a schematic diagram of a structure of first user equipment according to an embodiment of the present disclosure. User equipment 400 of this embodiment includes an acquiring module 41 and a receiving module 42.

The acquiring module 41 is configured to acquire configuration information related to system subgroup information that corresponds to a user equipment group that includes the user equipment.

A base station broadcasts, to user equipment of each user equipment group, system subgroup information that corresponds to the user equipment group. The user equipment needs to acquire in advance, by using the acquiring module 41, the configuration information related to the system subgroup information that corresponds to the user equipment group that includes the user equipment, so as to receive the corresponding system subgroup information.

The acquiring module 41 of the user equipment in connected mode may acquire, by using dedicated information, the configuration information related to the system subgroup information that corresponds to the user equipment group that includes the user equipment. The acquiring module 42 of the user equipment in idle mode may acquire, by using a radio resource control (RRC) release message of an attach procedure, the configuration information related to the system subgroup information that corresponds to the user equipment group that includes the user equipment.

Herein, the configuration information related to the system subgroup information may include a quantity of antenna ports or precoding information.

The receiving module 42 is configured to receive, according to the configuration information acquired by the acquiring module 41, the system subgroup information that corresponds to the user equipment group that includes the user equipment.

The receiving module 42 receives, according to the configuration information acquired by the acquiring module 41, the system subgroup information that corresponds to the user equipment group that includes the user equipment. After receiving the system subgroup information, the user equipment may determine, according to the system subgroup information, whether to execute a further operation.

The user equipment according to this embodiment can execute the steps in the message broadcast method of the embodiment shown in FIG. 3, and the implementation of the modules and functions thereof are only exemplarily described in this embodiment of the present disclosure. Based on a case in which an objective of the present disclosure can be achieved, division of the functional modules thereof is not limited to the foregoing manners, and the division may be performed by using any other possible implementation manners. For example, multiple units or components may be combined or may be integrated into another system, or some features may be ignored, or may not be executed.

Figure 10:
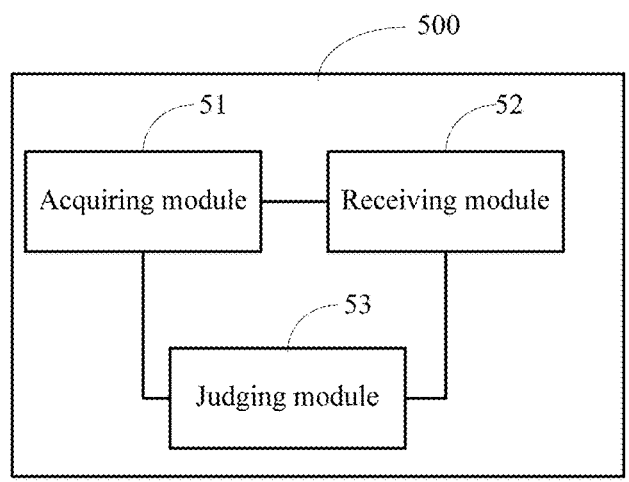
FIG. 10 is a schematic diagram of a structure of second user equipment according to an embodiment of the present disclosure.

FIG. 10 is a schematic diagram of a structure of second user equipment according to an embodiment of the present disclosure. User equipment 500 of this embodiment includes an acquiring module 51, a receiving module 52, and a judging module 53.

The acquiring module 51 is configured to acquire configuration information related to system subgroup information that corresponds to a user equipment group that includes the user equipment.

The receiving module 52 is configured to receive, according to the configuration information acquired by the acquiring module 51, the system subgroup information that corresponds to the user equipment group that includes the user equipment.

Specific implementations of functions of the acquiring module 51 and the receiving module 52 are basically the same as those described in the embodiment shown in FIG. 9. Refer to detailed descriptions of the embodiment shown in FIG. 9, and details are not described herein again.

The receiving module 52 of this embodiment is further configured to receive information indicating that system information changes, and the acquiring module 51 is configured to re-acquire public system information when the receiving module 52 receives the information indicating that system information changes or when the system information remains unchanged for a predetermined time.

The system information does not always remain unchanged. From the perspective of the user equipment, if the system information remains unchanged for a long period of time (for example: 3 hours), the user equipment may try to re-acquire the system information. In addition, if system information of a network side changes, the network side needs to notify the user equipment to update the system information. User equipment in either connected mode or idle mode may be notified by paging. However, the system information does not change at any time, but is updated in a specified radio frame. Therefore, a concept of a modification period is introduced. System information content in the modification period cannot change, and the system information can be modified only from a start moment of a next modification period. That is, when it is learned that the system information changes, new system information is listened to at the start moment of the next modification period, to re-acquire system information.

When system information remains unchanged for a predetermined time (for example: 3 hours), or the user equipment receives paging information or other information that indicates that the system information changes, the user equipment re-acquires the public system information.

The judging module 53 is configured to determine whether there is information indicating that the system subgroup information that corresponds to the user equipment group that includes the user equipment changes.

The judging module 53 may determine, from the information indicating that system information changes or the re-acquired public system information, whether there is information indicating that the system subgroup information that corresponds to the user equipment group that includes the user equipment changes. The information indicating that system information changes include a paging message.

In another case, when the user equipment moves, it also needs to be determined, according to the foregoing determining, whether the system subgroup information needs to be re-acquired.

When there is information indicating that the system subgroup information that corresponds to the user equipment group that includes the user equipment changes, the acquiring module 51 re-acquires system subgroup information that corresponds to the user equipment group that includes the user equipment.

When the user equipment 500 of this embodiment is user equipment of a first cell (for example, a macro cell), the user equipment of this embodiment may further include a triggering module, where the triggering module is configured to determine, according to corresponding system subgroup information, whether to trigger inter-frequency cell discovery and measurement.

When the user equipment 500 of this embodiment is user equipment for D2D communication, the user equipment of this embodiment may further include a determining module, where the determining module is configured to determine, according to corresponding system subgroup information, whether there is an available D2D communication resource.

When the user equipment 500 of this embodiment is user equipment supporting an NCT, the user equipment of this embodiment may further include an obtaining module, where the obtaining module is configured to obtain co-coverage NCT system information according to corresponding system subgroup information.

The user equipment according to this embodiment can execute the steps in the message broadcast method of the embodiment shown in FIG. 4, and the implementation of the modules and functions thereof are only exemplarily described in this embodiment of the present disclosure. Based on a case in which an objective of the present disclosure can be achieved, division of the functional modules thereof is not limited to the foregoing manners, and the division may be performed by using any other possible implementation manners. For example, multiple units or components may be combined or may be integrated into another system, or some features may be ignored, or may not be executed.

Figure 11:
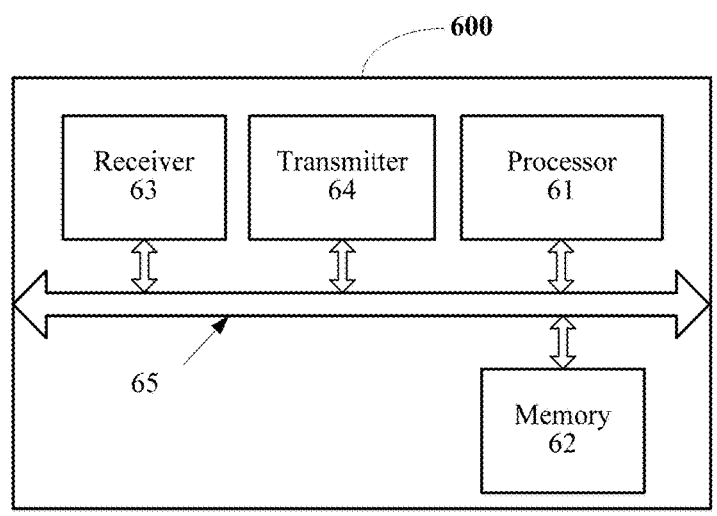
FIG. 11 is a schematic diagram of a structure of third user equipment according to an embodiment of the present disclosure.

FIG. 11 is a schematic diagram of a structure of third user equipment according to an embodiment of the present disclosure. User equipment 600 of this embodiment includes a processor 61, a memory 62, a receiver 63, a transmitter 64, and a bus system 65.

The processor 61 controls an operation of the user equipment 600. The processor 61 may also be referred to as a CPU. The processor 61 may be an integrated circuit chip and has a signal processing capability. The processor 31 may also be a general purpose processor, a digital signal processor (DSP), an application-specific integrated circuit (ASIC), a field programmable gate array (FPGA), or another programmable logical device, discrete gate or transistor logical device, or discrete hardware component. The general purpose processor may be a microprocessor or the processor may be any conventional processor and the like.

The memory 62 may include a read-only memory and a random access memory, and provides an instruction and data to the processor 61. A part of the memory 62 may further include a non-volatile random access memory (NVRAM).

Components of the user equipment 600 are coupled together by using the bus system 65, where in addition to a data bus, the bus system 65 may further include a power bus, a control bus, a status signal bus, and the like. The bus system may be an ISA (Industry Standard Architecture) bus, a PCI (peripheral component interconnect) bus or an EISA (Extended Industry Standard Architecture) bus, or the like. The bus may be one or more physical lines, and when there are multiple physical lines, the lines may be classified as an address bus, a data bus, a control bus, and the like. In some other embodiments of the present disclosure, the processor 61, the memory 62, the receiver 63, and the transmitter 64 may also be directly connected by using communications lines. However, for clear description, various types of buses in the figure are marked as the bus system 65.

The memory 62 stores the following elements, executable modules or data structures, or a subset thereof, or an extended set thereof. Operation instructions, including various operation instructions, used to implement various operations; and an operating system, including various system programs, used to implement various fundamental services and process hardware-based tasks.

In this embodiment of the present disclosure, the processor 61 performs, by invoking the operation instructions (where the operation instructions may be stored in the operating system) stored in the memory 62, the following operations.

The processor 61 is configured to acquire configuration information related to system subgroup information that corresponds to a user equipment group that includes the user equipment, where each piece of system subgroup information includes system information content that is applied to a user equipment group that corresponds to the system subgroup information. Control the receiver 63 to receive, according to the configuration information, the system subgroup information that corresponds to the user equipment group that includes the user equipment.

The processor 61 is further configured to control the transmitter 64 to send out network data.

The memory 62 is configured to store the configuration information and the system subgroup information.

The base station broadcasts, to user equipment of each user equipment group, system subgroup information that corresponds to the user equipment group. The user equipment needs to acquire in advance, by using the processor 61, the configuration information related to the system subgroup information that corresponds to the user equipment group that includes the user equipment, so as to receive the corresponding system subgroup information.

The processor 61 of the user equipment in connected mode may acquire, by using dedicated information, the configuration information related to the system subgroup information that corresponds to the user equipment group that includes the user equipment. The processor 61 of the user equipment in idle mode may acquire, by using an RRC release message of an attach procedure, the configuration information related to the system subgroup information that corresponds to the user equipment group that includes the user equipment.

Herein, the configuration information related to the system subgroup information may include a quantity of antenna ports or precoding information.

The processor 61 is further configured to control the receiver 63 to receive information indicating that system information changes, and the processor 61 re-acquires public system information when the receiver 63 receives the information indicating that system information changes or when the system information remains unchanged for a predetermined time.

The system information does not always remain unchanged. From the perspective of the user equipment, if the system information remains unchanged for a long period of time (for example: 3 hours), the processor 61 of the user equipment may try to re-acquire the system information. If system information of a network side changes, the network side notifies the user equipment to update the system information. For user equipment in either connected mode or idle mode, the user equipment may be notified, by paging, to update the system information.

When system information remains unchanged for a predetermined time (for example: 3 hours), or the user equipment receives paging information or other information that indicates that the system information changes, the processor 61 re-acquires the public system information.

After re-acquiring the public system information, the processor 61 further determines whether there is information indicating that the system subgroup information that corresponds to the user equipment group that includes the user equipment changes.

The processor 61 may determine, from the information indicating that system information changes or the re-acquired public system information, whether there is information indicating that the system subgroup information that corresponds to the user equipment group that includes the user equipment changes. The information indicating that system information changes include a paging message.

In another case, when the user equipment moves, the processor 61 also needs to determine, according to the foregoing determining, whether the system subgroup information needs to be re-acquired.

When there is information indicating that the system subgroup information that corresponds to the user equipment group that includes the user equipment changes, the processor 61 re-acquires system subgroup information that corresponds to the user equipment group that includes the user equipment.

When the user equipment of this embodiment is user equipment of a first cell (for example, a macro cell), the processor 61 may further determine, according to corresponding system subgroup information, whether to trigger inter-frequency cell discovery and measurement.

When the user equipment of this embodiment is user equipment for D2D communication, the processor 61 may further determine, according to corresponding system subgroup information, whether there is an available D2D communication resource.

When the user equipment of this embodiment is user equipment supporting an NCT, the processor 61 may further obtain co-coverage NCT system information according to corresponding system subgroup information.

The methods disclosed in the embodiments of the present disclosure may be applied to the processor 61, or are implemented by the processor 61. In an implementation process, steps of the foregoing methods may be performed by using an integrated logic circuit of hardware in the processor 61 or an instruction in a form of software. The processor 61 may implement or execute methods, steps, and logical block diagrams disclosed in the embodiments of the present disclosure. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically-erasable programmable memory or a register. The storage medium is located in the memory 62, and the processor 61 reads information in the memory 62 and completes the steps in the foregoing methods in combination with hardware of the processor 61.

According to the foregoing elaboration of the message broadcast method, the base station, and the user equipment provided by the embodiments of the present disclosure, it can be understood that, the base station of the present disclosure determines at least one piece of system subgroup information of system information of a first cell, where each piece of system subgroup information includes system information content that is applied to a user equipment group that corresponds to the system subgroup information. The base station also broadcasts, to the user equipment group, the system subgroup information that corresponds to the user equipment group. After receiving system subgroup information that corresponds to a user equipment group that includes the user equipment, the user equipment may determine, according to the system subgroup information, whether to execute a further operation. In such a manner, system information broadcast is more targeted, and user equipment receives only system subgroup information related to the user equipment; therefore, unnecessary behavior is not triggered.

In the several embodiments provided in the present disclosure, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of the present disclosure, and the protection scope of the present disclosure is not limited thereto. All equivalent structure or process changes made according to the content of this specification and accompanying drawings in the present disclosure or by directly or indirectly applying the present disclosure in other related technical fields shall fall within the protection scope of the present disclosure.

What is claimed is:

1. A method, comprising:
   dividing, by a base station, user equipment devices in a first cell into a plurality of user equipment groups, wherein the first cell is controlled by the base station, and different user equipment groups of the plurality of user equipment groups correspond to different areas of the first cell;
   determining, by the base station, a piece of system subgroup information of system information of the first cell, wherein the piece of system subgroup information comprises system information content that is applied to a first user equipment group of the plurality of user equipment groups, the first user equipment group corresponding to the piece of system subgroup information; and
   broadcasting, by the base station, to the first user equipment group using a beam that corresponds to an area of the first cell in which the first user equipment group is located, the piece of system subgroup information.

2. The method according to claim 1, wherein the broadcasting comprises:
   performing multiple user-multiple input multiple output precoding on the system subgroup information that corresponds to the first user equipment group; and
   broadcasting, to the first user equipment group using the beam that corresponds to the area in which the first user equipment group is located, the system subgroup information on which the multiple input multiple output precoding has been performed and that corresponds to the first user equipment group.

3. The method according to claim 1, further comprising:
   setting, by the base station, a beam width and a beam direction of a highly directional antenna according to location information of each area of the first cell, so that a beam formed by the highly directional antenna can cover an area that corresponds to the beam.

4. The method according to claim 3, wherein the highly directional antenna is an array antenna, a parabolic antenna, a circular array antenna, or a three-dimensional grid array antenna.

5. The method according to claim 1, wherein system subgroup information to each user equipment group of the plurality of user equipment groups is distinguished using an enhanced downlink physical control channel, or an enhanced downlink physical control channel and an enhanced downlink control channel.

6. The method according to claim 1, wherein the determining comprises:
determining the piece of system subgroup information by configuring a parameter of a demodulation reference signal, a scrambling code sequence index, an antenna port, or precoding.

7. A method, comprising:
acquiring, by a user equipment device, configuration information related to system subgroup information that corresponds to a first user equipment group of a plurality of user equipment groups, the first user equipment group comprising the user equipment device, wherein a piece of system subgroup information comprises system information content that is applied to the first user equipment group corresponding to the piece of system subgroup information, and user equipment devices in different areas in a cell are divided into different user equipment groups of the plurality of user equipment groups; and
receiving, by the user equipment device according to the configuration information, and using a beam that corresponds to an area in which the first user equipment group is located, the piece system subgroup information.

8. The method according to claim 7, wherein the acquiring comprises:
acquiring, by the user equipment device in connected mode using dedicated information, the configuration information; or
acquiring, by the user equipment device in idle mode using a radio resource control release message of an attach procedure, the configuration information.

9. The method according to claim 7, wherein the configuration information related to the system subgroup information comprises a quantity of antenna ports or precoding information.

10. The method according to claim 7, further comprising:
receiving, by the user equipment device, public system information, wherein the public system information comprises the configuration information and assistant identified fingerprint information.

11. A base station, comprising:
a processor coupled to a memory, a transmitter, and a receiver,
wherein the processor is configured to:
divide user equipment devices in different areas in a first cell into a plurality of user equipment groups, wherein the first cell is controlled by the base station, and different user equipment groups of the plurality of user equipment groups correspond to different areas of the first cell;
determine a piece of system subgroup information of system information of the first cell, the piece of system subgroup information comprising system information content that is applied to a first user equipment group of the plurality of user equipment groups, the first user equipment group corresponding to the piece of system subgroup information,
control the transmitter to broadcast, to the user equipment group using a beam that corresponds to an area in which the first user equipment group is located, the piece of system subgroup information; and
control the receiver to receive communication data from a network, and
wherein the memory is configured to store the piece of system subgroup information of the system information of the first cell.

12. The base station according to claim 11, wherein the processor performs multiple user-multiple input multiple output precoding on the system subgroup information that corresponds to the first user equipment group, and wherein the transmitter broadcasts, to the first user equipment group using the beam to the area in which the first user equipment group is located, the system subgroup information on which the multiple input multiple output precoding has been performed and to the first user equipment group.

13. The base station according to claim 11, wherein the processor is further configured to set a beam width and a beam direction of a highly directional antenna according to location information of each area, so that a beam formed by the highly directional antenna can cover an area that corresponds to the beam.

14. The base station according to claim 13, wherein the highly directional antenna is: an array antenna, a parabolic antenna, a circular array antenna, or a three-dimensional grid array antenna.

15. The base station according to claim 11, wherein system subgroup information to each user equipment group is distinguished using an enhanced downlink physical control channel, or an enhanced downlink physical control channel and an enhanced downlink control channel.

16. The base station according to claim 11, wherein the processor is further configured to determine the piece of system subgroup information by configuring a parameter of a demodulation reference signal, a scrambling code sequence index, an antenna port, or precoding.

17. A user equipment device, comprising:
a processor coupled to a memory, a transmitter, and a receiver,
wherein the processor is configured to:
acquire configuration information related to system subgroup information that corresponds to a first user equipment group of a plurality of user equipment groups, the first user equipment group comprising the user equipment device, wherein a piece of system subgroup information comprises system information content that is applied to the first user equipment group corresponding to the piece of system subgroup information, and user equipment devices in different areas in a cell are divided into different user equipment groups of the plurality of user equipment groups,
control the receiver to receive, according to the configuration information, and using a beam that corresponds to an area in which the first user equipment group is located, the piece of system subgroup information, and
control the transmitter to send out network data, and
wherein the memory is configured to store the configuration information and the system subgroup information.

18. The user equipment device according to claim 17, wherein the processor is further configured to acquire, using dedicated information, the configuration information; or the processor is further configured to acquire, by using a radio resource control release message of an attach procedure, the configuration information.

19. The user equipment device according to claim 17, wherein the configuration information related to the system subgroup information comprises a quantity of antenna ports or precoding information.

20. The user equipment device according to claim 17, wherein the receiver is further configured to receive public system information, wherein the public system information comprises the configuration information and assistant identified fingerprint information.

\* \* \* \* \*

UNITED STATES PATENT AND TRADEMARK OFFICE
CERTIFICATE OF CORRECTION

PATENT NO. : 10,200,937 B2
APPLICATION NO. : 15/192864
DATED : February 5, 2019
INVENTOR(S) : Li Chai et al.

Page 1 of 1

It is certified that error appears in the above-identified patent and that said Letters Patent is hereby corrected as shown below:

In the Claims

In Column 39, Line 8, Claim 5, delete "subgroup information to each user" and insert --subgroup information that corresponds to each user--.

In Column 39, Line 35, Claim 7, delete "the piece system" and insert --the piece of system--.

In Column 40, Line 19, Claim 12, delete "using the beam to the area" and insert --using the beam that corresponds to the area--.

In Column 40, Line 22, Claim 12, delete "and to" and insert --and that corresponds to--.

In Column 40, Line 34, Claim 15, delete "information to" and insert --information that corresponds to--.

Signed and Sealed this
Twenty-sixth Day of March, 2019

Andrei Iancu
*Director of the United States Patent and Trademark Office*